(12) United States Patent
Rogers

(10) Patent No.: US 7,453,885 B2
(45) Date of Patent: Nov. 18, 2008

(54) NETWORK CONNECTION DEVICE

(75) Inventor: Steven A Rogers, Portsmouth, NH (US)

(73) Assignee: Rivulet Communications, Inc., Portsmouth, NH (US)

( * ) Notice: Subject to any disclaimer, the term of this patent is extended or adjusted under 35 U.S.C. 154(b) by 576 days.

(21) Appl. No.: 10/962,521

(22) Filed: Oct. 13, 2004

(65) Prior Publication Data

US 2006/0077981 A1    Apr. 13, 2006

(51) Int. Cl.
*H04L 12/56* (2006.01)

(52) U.S. Cl. .................. 370/395.4; 370/468

(58) Field of Classification Search .......... 370/171, 370/401, 395, 465–468, 395.2–395.5, 332, 370/503, 329, 352, 227–229, 230–231; 709/238, 709/240

See application file for complete search history.

(56) References Cited

U.S. PATENT DOCUMENTS

| | | | |
|---|---|---|---|
| 4,745,593 | A | 5/1988 | Stewart |
| 5,271,000 | A | 12/1993 | Engbersen et al. |
| 5,373,504 | A | 12/1994 | Tanaka et al. |
| 5,408,465 | A | 4/1995 | Gusella et al. |
| 5,432,775 | A | 7/1995 | Crayford |
| 5,455,865 | A | 10/1995 | Perlman |
| 5,477,531 | A | 12/1995 | McKee et al. |
| 5,517,620 | A | 5/1996 | Hashimoto et al. |
| 5,541,921 | A | 7/1996 | Swenson et al. |
| 5,563,875 | A | 10/1996 | Hefel et al. |
| 5,610,903 | A | 3/1997 | Crayford |
| 5,734,656 | A | 3/1998 | Prince et al. |
| 5,774,668 | A | 6/1998 | Choquier et al. |
| 5,781,534 | A | 7/1998 | Perlman et al. |
| 5,859,835 | A | 1/1999 | Varma |
| 5,859,979 | A | 1/1999 | Tung et al. |
| 5,917,822 | A | 6/1999 | Lyles et al. |

(Continued)

FOREIGN PATENT DOCUMENTS

EP    0827307 A2    3/1998

(Continued)

OTHER PUBLICATIONS

Yi Du, Gerald M. Masson, Enhancing accuracy of probe packet-based congestion detection in high sped networks, IEEE 1998.*

(Continued)

*Primary Examiner*—Aung S Moe
*Assistant Examiner*—Habte Mered
(74) *Attorney, Agent, or Firm*—Banner & Witcoff, Ltd.

(57) ABSTRACT

A network connection device bridges a first network that uses a negotiated packet delivery scheduling scheme and a second network that uses an empirically determined packet delivery scheduling scheme. The network connection device translates a request to communicate over the first network into a request to communicate over the second network, thus bridging the two networks. The negotiated packet delivery scheduling scheme permits endpoints to negotiate scheduled delivery times for packets, while the empirically determined packet delivery scheme tests various time interval locations in a network to determine favorable time locations for transmission. The two protocols are bridged by finding compatible overlaps between time interval locations in the two networks. This can provide error-free delivery with low jitter among packets.

31 Claims, 20 Drawing Sheets

U.S. PATENT DOCUMENTS

| | | | |
|---|---|---|---|
| 5,974,056 | A | 10/1999 | Wilson et al. |
| 6,047,054 | A | 4/2000 | Bayless et al. |
| 6,058,117 | A | 5/2000 | Ennamorato et al. |
| 6,067,572 | A | 5/2000 | Jensen et al. |
| 6,088,361 | A | 7/2000 | Hughes et al. |
| 6,134,589 | A | 10/2000 | Hultgren |
| 6,208,666 | B1 | 3/2001 | Lawrence et al. |
| 6,240,084 | B1 | 5/2001 | Oran et al. |
| 6,247,061 | B1 | 6/2001 | Douceur et al. |
| 6,272,131 | B1 | 8/2001 | Ofek |
| 6,330,236 | B1 | 12/2001 | Ofek et al. |
| 6,353,618 | B1 | 3/2002 | Hung et al. |
| 6,359,885 | B1 | 3/2002 | Kim et al. |
| 6,360,271 | B1 | 3/2002 | Schuster et al. |
| 6,373,822 | B1 | 4/2002 | Raj et al. |
| 6,377,579 | B1 | 4/2002 | Ofek |
| 6,385,198 | B1 | 5/2002 | Ofek et al. |
| 6,426,814 | B1 | 7/2002 | Berger et al. |
| 6,426,944 | B1 | 7/2002 | Moore |
| 6,480,506 | B1 | 11/2002 | Gubbi |
| 6,487,593 | B2 | 11/2002 | Banks |
| 6,496,477 | B1 | 12/2002 | Perkins et al. |
| 6,502,135 | B1 | 12/2002 | Munger et al. |
| 6,529,480 | B1 | 3/2003 | Stewart et al. |
| 6,556,564 | B2 | 4/2003 | Rogers |
| 6,560,222 | B1 | 5/2003 | Pounds et al. |
| 6,574,193 | B1 | 6/2003 | Kinrot |
| 6,611,519 | B1* | 8/2003 | Howe .......................... 370/386 |
| 6,618,360 | B1 | 9/2003 | Scoville et al. |
| 6,618,761 | B2 | 9/2003 | Munger et al. |
| 6,628,629 | B1 | 9/2003 | Jorgensen |
| 6,633,544 | B1 | 10/2003 | Rexford et al. |
| 6,657,959 | B1 | 12/2003 | Chong et al. |
| 6,711,137 | B1 | 3/2004 | Klassen et al. |
| 6,731,600 | B1 | 5/2004 | Patel et al. |
| 6,778,536 | B1 | 8/2004 | Ofek et al. |
| 6,788,702 | B1 | 9/2004 | Garcia-Luna-Aceves et al. |
| 6,871,078 | B2 | 3/2005 | Nishioka et al. |
| 6,885,641 | B1 | 4/2005 | Chan et al. |
| 6,973,067 | B1 | 12/2005 | Haartsen |
| 6,975,624 | B1* | 12/2005 | Oda et al. .................... 370/354 |
| 7,080,160 | B2 | 7/2006 | Cognet et al. |
| 7,116,639 | B1 | 10/2006 | Gail et al. |
| 7,200,158 | B2 | 4/2007 | Gustin |
| 7,215,659 | B1* | 5/2007 | Chen et al. ................... 370/338 |
| 2001/0033565 | A1 | 10/2001 | Rogers |
| 2001/0033649 | A1 | 10/2001 | Rogers |
| 2002/0010792 | A1 | 1/2002 | Border et al. |
| 2002/0031144 | A1* | 3/2002 | Barton ........................ 370/468 |
| 2002/0044557 | A1 | 4/2002 | Isoyama |
| 2002/0054611 | A1* | 5/2002 | Seta ........................... 370/503 |
| 2002/0071391 | A1* | 6/2002 | Ishioka ....................... 370/238 |
| 2002/0080719 | A1 | 6/2002 | Parkvall et al. |
| 2002/0086641 | A1 | 7/2002 | Howard |
| 2002/0110129 | A1 | 8/2002 | Matsuoka et al. |
| 2002/0186660 | A1 | 12/2002 | Bahadiroglu |
| 2002/0191592 | A1 | 12/2002 | Rogers et al. |
| 2003/0012163 | A1 | 1/2003 | Cafarelli et al. |
| 2003/0021287 | A1 | 1/2003 | Lee et al. |
| 2003/0058880 | A1 | 3/2003 | Sarkinen et al. |
| 2003/0067903 | A1 | 4/2003 | Jorgensen |
| 2003/0107991 | A1 | 6/2003 | Tezuka et al. |
| 2003/0117959 | A1 | 6/2003 | Taranov |
| 2003/0188188 | A1* | 10/2003 | Padmanabhan et al. ..... 713/201 |
| 2003/0219029 | A1 | 11/2003 | Pickett |
| 2004/0008655 | A1 | 1/2004 | Park et al. |
| 2004/0014491 | A1 | 1/2004 | Weigand |
| 2004/0024550 | A1 | 2/2004 | Doerken et al. |
| 2004/0160340 | A1 | 8/2004 | Thomson et al. |
| 2004/0160916 | A1* | 8/2004 | Vukovic et al. ............. 370/332 |
| 2004/0179530 | A1* | 9/2004 | Verbesselt et al. ......... 370/395.1 |
| 2005/0003856 | A1* | 1/2005 | Jang et al. ................. 455/553.1 |
| 2005/0058083 | A1 | 3/2005 | Rogers |
| 2005/0058137 | A1 | 3/2005 | Carlson et al. |
| 2005/0058151 | A1* | 3/2005 | Yeh ........................... 370/445 |
| 2005/0086362 | A1* | 4/2005 | Rogers ....................... 709/235 |
| 2006/0047557 | A1* | 3/2006 | Bieselin et al. ................ 705/9 |
| 2006/0056296 | A1* | 3/2006 | Nandagopalan et al. ..... 370/230 |
| 2006/0168336 | A1 | 7/2006 | Koyanagi et al. |

FOREIGN PATENT DOCUMENTS

| | | |
|---|---|---|
| JP | 04/056322 A | 2/2004 |
| WO | WO 00/28705 | 5/2000 |
| WO | WO 00/28706 | 5/2000 |
| WO | WO 01/60029 A1 | 1/2001 |
| WO | WO 01/47162 A1 | 6/2001 |
| WO | WO 01/50146 A1 | 7/2001 |
| WO | WO 01/59994 A1 | 8/2001 |
| WO | WO 02/41505 A2 | 5/2002 |
| WO | WO 02/100023 A2 | 12/2002 |
| WO | WO 02/100023 A3 | 12/2002 |
| WO | WO 03/084137 A2 | 10/2003 |

OTHER PUBLICATIONS

Business Communications Review; Sep. 2003; "Circuit-y New Choices for IP Networks" pp. 18-24.

IEEE Communications Magazine Oct. 2003; Topics in Internet Technology; "Packet Sequencing: a Deterministic Protocol for QoS in IP Networks" Sean S.B. Moore and Curtis A. Siller, Jr., Cetacean Networks, Inc. pp. 98-107.

Packet Sequencing: A Layer -2 Wan Switching Technology for Per-Flow Ideal QoS and Secure IP Networking: Steven A. Rogers, Sean S.B. Moore and Curtis A. Siller, Jr.; Abstract pp. 1-6.

Cetacean Networks; www.cetacean.com; "Cost-Effective IP Networks for High Quality Videoconferencing" Nov. 2002; pp. 1-9.

Copyright @ 2003, Cetacean Networks, Inc.; A Deterministic Protocol for QoS in IP Networks: Packet Sequencing; Steven A. Rogers, Sean S.B. Moore, Ph.D. and Curtis A. Siller, Jr. Ph.D.; Abstract pp. 1-18.

Copyright @ 2002 Cetacean Networks Inc.; IP Videoconferencing Solution Performance: Packet Sequencing vs. Prioritization; pp. 1-8.

Copyright @ 2003; MultiService Converged IP Networks; Sean S.B. Moore, Ph.D.; Cetacean Networks, Inc.; pp. 1-10.

Copyright @ 2001; Practical Limits on Network Utilization in Converged IP Networks; Sean S.B. Moore, Ph.D. ; Cetacean Networks, Inc.; pp. 1-2.

Self-Adjusted Network Transmission for Multimedia Data; Mei-Ling Shyu, Shu-Ching Chen, Hongli Luo; Abstract; 6pages.

The Problem of Upstream Traffic Synchronization in Passive Optical Networks; Glen Kramer; Abstract pp. 1-7.

Clark, M; Jeffay, K; Application -level Measurements of Performance on the vBNS Multimedia Computing and Systems, 1999. IEEE International Conference on Jun. 1999, vol. 2, 7-11, pp. 362-366 vol. 2.

Copyright @ 2003; Packet Sequencing: IP Networks; Sean S.B. Moore, Ph.D.; Cetacean Networks, Inc.; pp. 98-107.

Clark, M; Jeffay, K; Application—level Measurements of Performance on the vBNS Multimedia Computing and Systems; 1999; IEEE International Conference on Jun. 1999, vol. 2, 7-11, pp. 362-366 vol. 2.

PCT International Search Report dated May 24, 2006.

Distributed Path Reservation Algorithms for Multiplexed all-Optical Interconnection Networks, X. Yuan, R. Melhem and R. Gupta; Abstract 10 pages.

The Desk Area Network; Mark Hayter and Derek McAuley; May 1991; Abstract pp. 11.

* cited by examiner

NETWORK CONNECTION DEVICE

BACKGROUND OF THE INVENTION

The present invention relates generally to a device and method for facilitating virtual connections between two different types of networks, each of which uses a different packet delivery scheme.

As is generally known, Ethernet and Internet Protocol (IP) are systems for transmitting packets between different points on a communications network. These switching systems are known as "contention-based" systems. That is, all transmitters contend for network resources. All transmitters may transmit simultaneously. If they do, then network resources may be oversubscribed. When this happens, data may be delayed or lost, resulting in network impairment.

As illustrated in FIG. 1, four streams of packets are input to a packet switch 112, which routes the packets to one or more outputs based on addressing information contained in each packet. Packets may arrive at the switch at unpredictable times, leading to bursts of inputs that must be handled. The switch typically maintains a packet queue 114 that is able to store a small number of packets. (In some devices, one queue is provided for each output port, such that if there are 8 ports, there may be 8 queues provided). Each queue may comprise multiple queues arranged by packet priority level, such that priority 3 packets, for example, take precedence over priority 1 packets. If the inputs are too bursty, the queues fill up and some packets may be discarded. The higher-priority queues are typically emptied before the lower-priority queues, such that the lower-priority queues are more likely to lose data first.

IP systems suffer from impairments such as packet loss and jitter. This happens because there is no control over how many such packets reach a router at any given instant. If two packets arrive at a router at the same time, destined for the same port, one will have to be delayed. Both cannot be transmitted simultaneously. One of the packets will be saved in the queue until the first packet is completely transmitted.

FIG. 2 shows a computer network comprising endpoints 100, 101, 102, and 103. The network includes routers 104 through 107. As shown in the figure, if endpoints 100 and 101 communicate with endpoints 102 and 103 at the same time, a bottleneck may develop between routers 105 and 106. This may occur because too many packets may be simultaneously transmitted between the routers, causing the routers to discard overflow packets. This can happen even at low levels of average network utilization.

Various methods have been developed to overcome data loss on Ethernet and IP networks. The primary approach has been to use additional protocols to replace lost data. This is an after-the-fact solution. An example is the well-known Transmission Control Protocol (TCP). TCP is able to detect data loss and it causes retransmission of the data, until a perfect copy of the complete data file is delivered to the recipient device.

One approach for providing reliable first-time delivery is to empirically determine the optimal scheduling of packets in the network by first transmitting test packets during different time periods and, after evaluating latency and/or dropped packet rates for each time period, selecting one or more time periods having favorable transmission characteristics. Packets that are dropped or delayed due to overloaded router queues will indicate unfavorable scheduling conditions, and the transmitting node can select a more favorable schedule for transmitting future packets to minimize the likelihood of packet loss. This approach is described in the previously-filed U.S. patent application Ser. No. 10/663,378 (filed on Aug. 17, 2003), which is described in detail below in conjunction with the principles of the present invention (see the heading entitled Empirical Scheduling of Network Packets below). Using this approach, a virtual connection can be established between two nodes in the network, such as a WAN comprising routers.

Another type of packet congestion problem may occur in a local area network (LAN) comprising LAN switches. As shown in FIG. 3, for example, a conventional network comprises a plurality of Local Area Network (LAN) endpoints, such as computers connected to an Ethernet LAN. The endpoints are coupled to one or more LAN switches 302, which connect through another part of the network to one or more additional LAN endpoints 303. When endpoint 301 sends packets to endpoint 303, the packets are sent through LAN switch 302, which also handles packets from other LAN endpoints. If too many packets are simultaneously transmitted by the other endpoints to 303, LAN switch 302 may have a queue overflow, causing packets to be lost. (The word "packets" will be used to refer to datagrams in a LAN or Wide Area Network (WAN) environment. In a LAN environment, packets are sometimes called "frames." In a packet-switched WAN environment, packet-switching devices are normally referred to as "routers.").

FIG. 4 illustrates the nature of the problem of dropped packets in the network of FIG. 3, which can occur in a LAN environment as well as a WAN environment. During periods where multiple endpoints are simultaneously transmitting packets on the network, the LAN switch 302 may become overloaded, such that some packets are discarded. This is typically caused by an internal queue in the LAN switch becoming full and thus becoming unable to accept new packets until the outgoing packets have been removed from the queue. This creates a problem in that transmitting endpoints cannot be guaranteed that their packets will arrive, necessitating other solutions such as the use of guaranteed-delivery protocols such as Transmission Control Protocol (TCP). Such solutions may be inappropriate for streaming video or other real-time applications, which cannot wait for retransmission of packets.

Another approach for providing reliable first-time delivery in a network of the type shown in FIG. 3 is to have the transmitting node and receiving node in a network agree on a transmission schedule that is compatible with both nodes. For example, when a transmitting node needs to establish a virtual connection with another node in the network, the transmitting node can send a proposed schedule to the receiving node indicating time interval locations during which it proposes to transmit future packets. The receiving node can compare this proposed "transmission map" with other scheduled deliveries at the receiving node and either accept the proposed transmission schedule or propose a different transmission schedule that will minimize packet congestion in the network. This approach is described in U.S. patent application Ser. No. 10/697,103, filed on Oct. 31, 2003, and described below in conjunction with the principles of the invention (see the heading entitled Negotiated Packet Delivery). Using this approach, a virtual connection can be established between two nodes in the network, such as a LAN comprising LAN switches.

It may be necessary to establish virtual connections between different types of networks having incompatible packet scheduling algorithms. For example, as shown in FIG. 5, a first endpoint 501 may be associated with a LAN 504 that employs the negotiated packet scheduling technique discussed above (i.e., endpoints in LAN 504 negotiate "transmission maps" in order to avoid congestion on network 504).

A second endpoint 502 may be located on another LAN 508 that must be accessed through WAN 503 that employs the empirical packet scheduling technique discussed above (i.e., endpoints in WAN 503 transmit test packets to each other in order to empirically determine the most advantageous time periods for transmitting packets). If endpoint 501 needs to transmit packets to endpoint 502, difficulties may arise due to incompatible protocols being used for transmitting packets on the networks.

SUMMARY OF THE INVENTION

According to one aspect of the invention, a device and method are provided that allow endpoints on incompatible networks (e.g., an empirically scheduled network and a negotiated scheduled network) to communicate with each other. In one variation, a network connection device (NCD) acts as a proxy device which establishes a virtual connection between the networks. The device may perform handshaking functions to set up and tear down connections between the networks, and may optionally include firewall features and network address translation (NAT) functions. A method according to the invention includes steps of establishing a connection for packet transmission between the incompatible networks and for routing packets according to the differing network protocols.

DETAILED DESCRIPTION

Before describing various principles of the present invention, the following explains how packets can be transmitted in networks according to either an empirically determined scheduling technique or a negotiated scheduling technique. It should be clear that both techniques can be used on any type of network.

A. Empirical Scheduling of Network Packets

Figure 6:
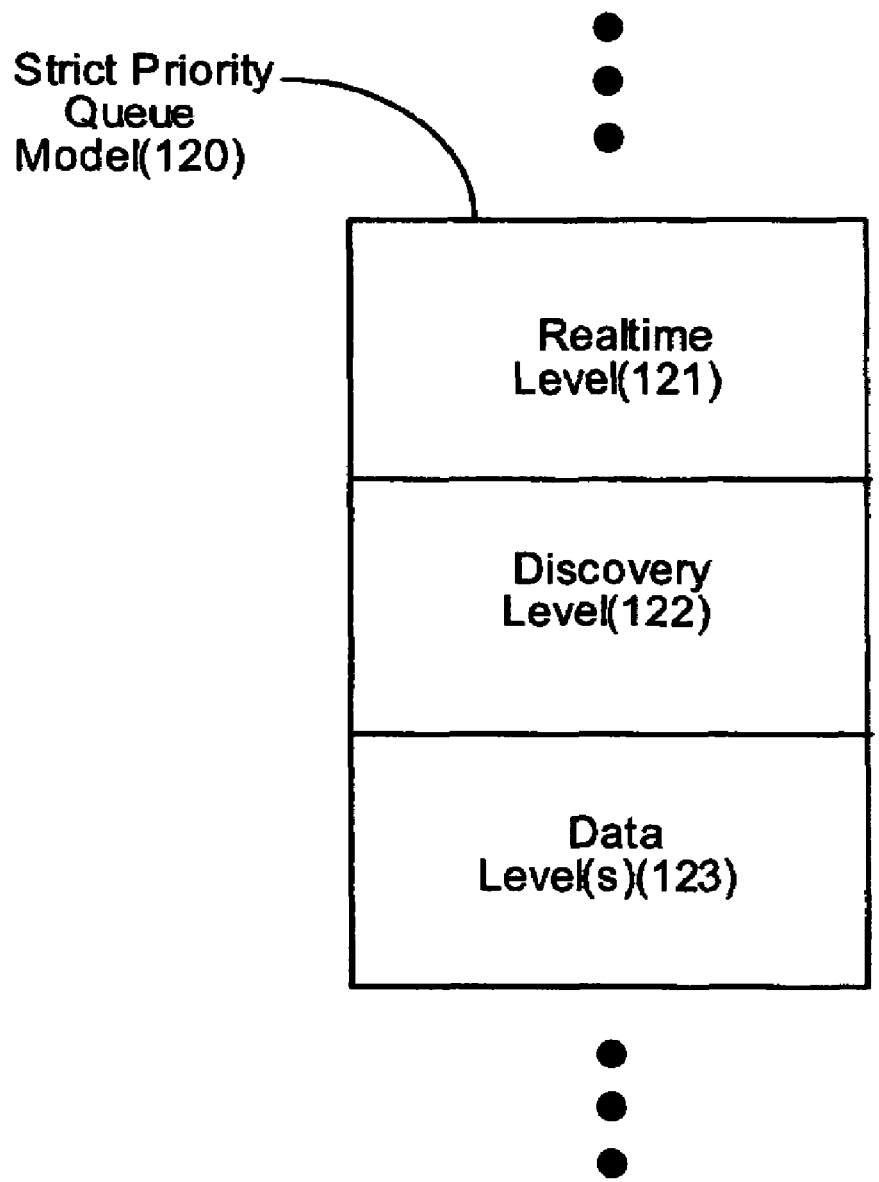
FIG. 6 shows one approach for assigning different priority levels to scheduled data (realtime level); test packets (discovery level); and other network traffic (data level).

For networks that schedule packets using an empirical approach, a priority scheme can be used to assign priority levels to data packets in a network such that delivery of packets intended for real-time or near real-time delivery (e.g., phone calls, video frames, or TDM data packets converted into IP packets) are assigned the highest priority in the network. A second-highest priority level is assigned to data packets that are used for testing purposes (i.e. the so-called test packets). A third-highest priority level is assigned to remaining data packets in the system, such as TCP data used by web browsers. FIG. 6 illustrates this scheme. These priority levels can be assigned by enabling the packet priority scheme already available in many routers.

Other priority levels above and below these three levels can be accommodated as well. For example, a priority level above the real-time level can be assigned for emergency purposes, or for network-level messages (e.g., messages that instruct routers or other devices to perform different functions).

Figure 7:
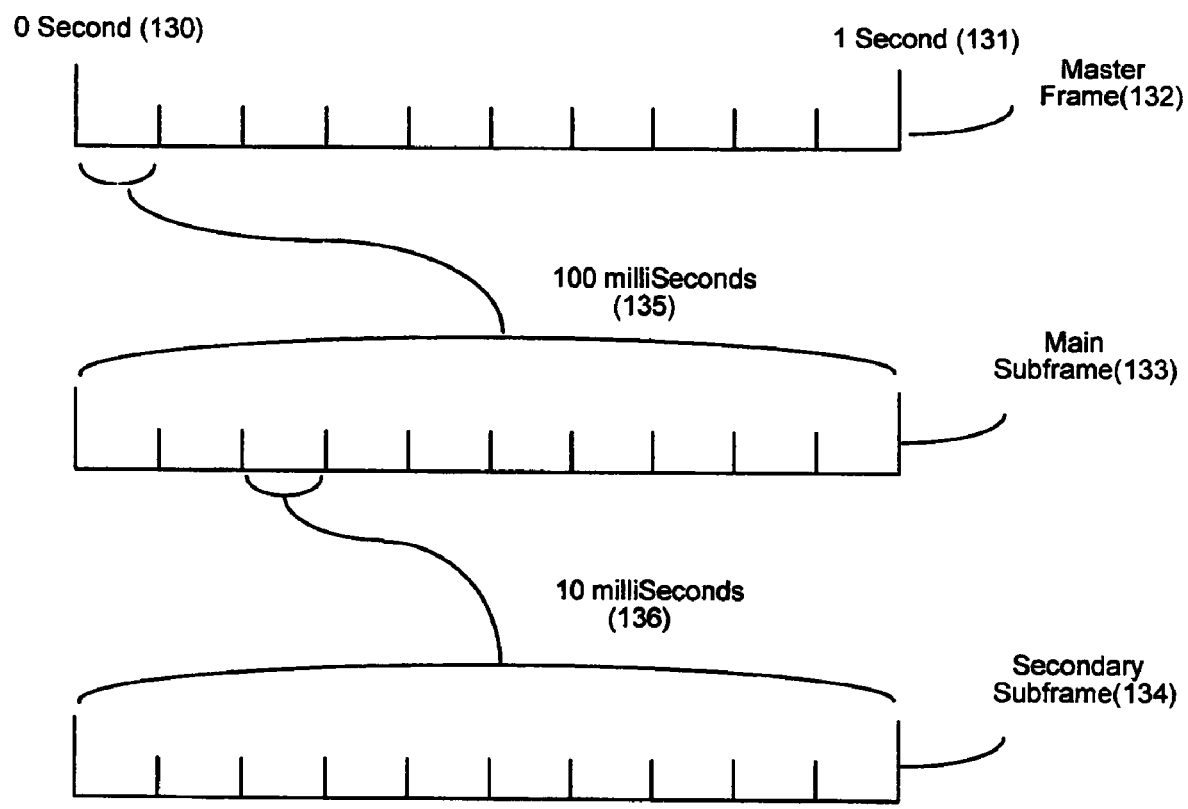
FIG. 7 shows a frame structure in which a delivery schedule can be decomposed into a master frame; subframes; and secondary subframes.

FIG. 7 shows how an arbitrary delivery time period of one second (a master frame) can be decomposed into subframes each of 100 millisecond duration, and how each subframe can be further decomposed into secondary subframes each of 10 millisecond duration. Each secondary subframe is in turn divided into time intervals of 1 millisecond duration, and this decomposition can be continued to any desired level of granularity. According to one variation, the delivery time period for each second of transmission bandwidth is decomposed using a scheme such as that shown in FIG. 7 and packets are assigned to one or more time interval locations according to this schedule for purposes of transmitting test packets and for delivering data using the inventive principles. In this sense, the scheme resembles conventional TDM systems. However, unlike TDM systems, no endpoint can be guaranteed to have a particular timeslot or timeslots. Instead, nodes on the network transmit using interval locations that are empirically determined to be favorable based on the prior transmission of test packets between the two endpoints. (Note: the term "interval location" or "time interval location" will be used rather than "time slot" in order to distinguish TDM systems).

Figure 8:
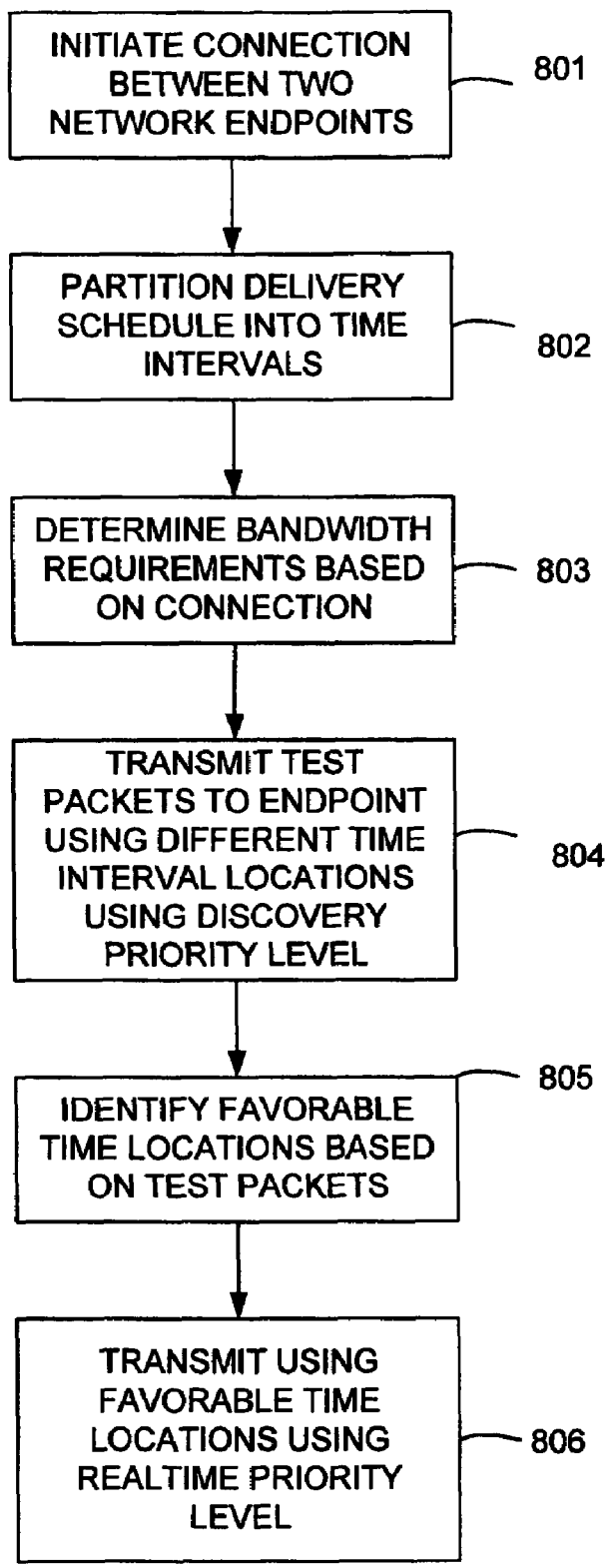
FIG. 8 shows a flow chart having steps for performing empirical scheduling over a network such as a WAN.

FIG. 8 shows method steps that can be used to schedule packets in a network, such as a WAN, using an empirically determined packet delivery scheme. Beginning in step 801, a determination is made that two endpoints on the network (e.g., an Ethernet network or an IP network) desire to communicate. This determination may be the result of a telephone receiver being picked up and a telephone number being dialed, indicating that two nodes need to initiate a voice-over-IP connection. Alternatively, a one-way connection may need to be established between a node that is transmitting video data and a receiving node. Each of these connection types can be expected to impose a certain amount of data packet traffic on the network. For example, a voice-over-IP connection may require 64 kilobits per second transfer rate using 80-byte packet payloads with packets being sent every 10 milliseconds (not including packet headers). A video stream would typically impose higher bandwidth requirements on the network.

Note that for two-way communication, two separate connections must be established: one for node A transmitting to node B, and another connection for node B transmitting to node A. Although the inventive principles will be described with respect to a one-way transmission, it should be understood that the same steps would be repeated at the other endpoint where a two-way connection is desired.

In step 802, a delivery schedule is partitioned into interval locations according to a scheme such as that illustrated in FIG. 7. (This step can be done in advance and need not be repeated every time a connection is established between two endpoints). The delivery schedule can be derived from a clock such as provided by a Global Positioning System (GPS). As one example, an arbitrary time period of one second can be established for a master frame, which can be successively decomposed into subframes and secondary subframes, wherein each subframe is composed of 10 intervals each of 10 milliseconds in duration and each secondary subframe is compose of 10 intervals each of 1 millisecond in duration. Therefore, a period of one second would comprise 1,000 intervals of 1 millisecond duration. Other time periods could of course be used, and the invention is not intended to be limited to any particular timing scheme.

In step 803, the required bandwidth between the two endpoints is determined. For example, for a single voice-over-IP connection, a bandwidth of 64 kilobits per second might be needed. Assuming a packet size of 80 bytes or 640 bits (ignoring packet overhead for the moment), this would mean that 100 packets per second must be transmitted, which works out to (on average) a packet every 10 milliseconds. Returning to the example shown in FIG. 7, this would mean transmitting a packet during at least one of the time intervals in the secondary subframe at the bottom of the figure. (Each interval corresponds to one millisecond).

In step 804, a plurality of test packets are transmitted during different time intervals at a rate needed to support the desired bandwidth. Each test packet is transmitted using a "discovery" level priority (see FIG. 6) that is higher than that accorded to normal data packets (e.g., TCP packets) but lower than that assigned to realtime data traffic (to be discussed below). For example, turning briefly to FIG. 9, suppose that the schedule has been partitioned into one millisecond time intervals. The test packets might be transmitted during time intervals 1, 3, 5, 7, 9, 11, and 12 as shown. Each test packet preferably contains the "discovery" level priority; a timestamp to indicate when the packet was sent; a unique sequence number from which the packet can be identified after it has been transmitted; and some means of identifying what time interval was used to transmit the packet. (The time interval might be inferred from the sequence number). The receiving endpoint upon receiving the test packets may return the packets to the sender, which allows the sender to (a) confirm how many of the sent packets were actually received; and (b) determine the latency of each packet. Instead of returning the packets, the receiving endpoint can send a summary packet summarizing statistics for the test packets. Other approaches for determining latency can of course be used. The evaluation can be done by the sender, the recipient, or a combination of the two.

In step 806, the sender evaluates the test packets to determine which time interval or intervals are most favorable for carrying out the connection. For example, if it is determined that packets transmitted using time interval #1 suffered a lower average dropped packet rate than the other intervals, that interval would be preferred. Similarly, the time interval that resulted in the lowest packet latency (round-trip from the sender) could be preferred over other time intervals that had higher latencies. The theory is that packet switches that are beginning to be stressed would have queues that are beginning to fill up, causing increases in latency, jitter, and dropped packets. Accordingly, according to the inventive principles other time intervals could be used to avoid transmitting packets during periods that are likely to increase queue lengths in those switches. In one variation, the time intervals can be "overstressed" to stretch the system a bit. For example, if only 80-byte packets are actually needed, 160-byte packets could be transmitted during the test phase to represent an overloaded condition. The overloaded condition might reveal bottlenecks where the normal 80-byte packets might not.

Rather than the recipient sending back time-stamped packets, the recipient could instead perform statistics on collected test packets and send back a report identifying the latencies and dropped packet rates associated with each time interval.

As explained above, packet header overhead has been ignored but would typically be included in the evaluation process (i.e., 80-byte packets would increase by the size of the packet header). Interval selection for the test packets could be determined randomly (i.e., a random selection of time intervals could be selected for the test packets), or they could be determined based on previously used time intervals. For example, if a transmitting node is already transmitting during time interval 3, it would know in advance that such a time interval might not be a desirable choice for a second connection. As another example, if the transmitting node is already transmitting during interval 3, the test packets could be transmitted in a time interval location that is furthest away from interval location 3, in order to spread out as much as possible the packet distribution.

In step 806, a connection is established between the two endpoints and packets are transmitted using the higher "realtime" priority level and using the interval or intervals that were determined to be more favorable for transmission. Because the higher priority level is used, the connections are not affected by test packets transmitted across the network, which are at a lower priority level. In one variation, the IP precedence field in IP packet headers can be used to establish the different priority levels.

Figure 9:
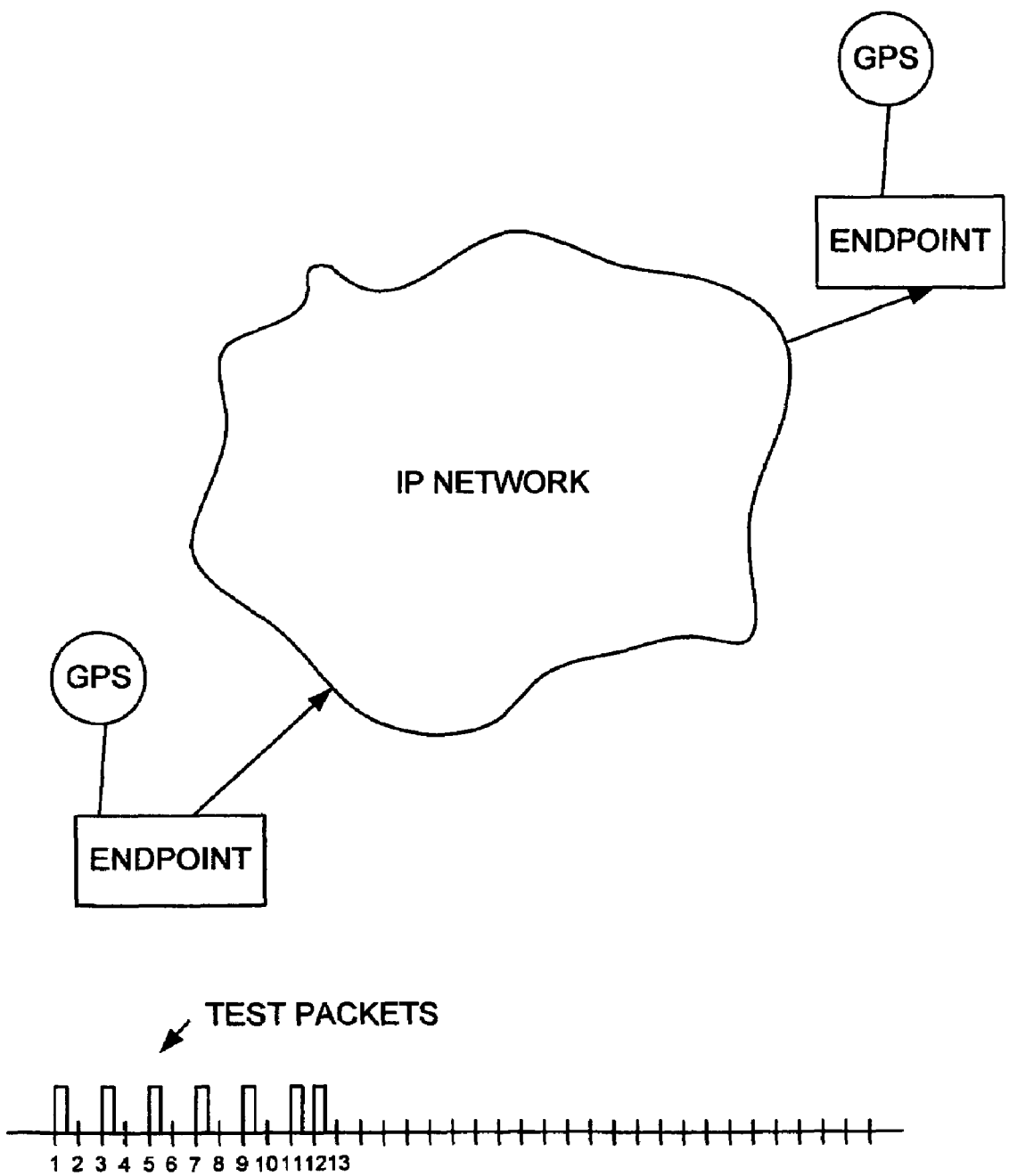
FIG. 9 shows a system using a delivery schedule for test packets from a first endpoint to a second endpoint.

FIG. 9 shows a system employing various principles of the invention. As shown in FIG. 9, two endpoints each rely on a GPS receiver for accurate time clock synchronization (e.g., for timestamping and latency determination purposes). The IP network may be comprised of a plurality of routers and/or other network devices that are able to ultimately route packets (e.g., IP or Ethernet packets) from one endpoint to the other. It is assumed that the organization configuring the network has the ability to control priority levels used on the network, in order to prevent other nodes from using the discovery priority level and realtime priority level.

It should be appreciated that rather than transmitting test packets simultaneously during different time interval locations, a single time interval location can be tested, then another one, and so on, until an appropriate interval location is found for transmission. This would increase the time required to establish a connection. Also, as described above, for a two-way connection, both endpoints would carry out the steps to establish the connection.

The scheme will also work with "early discard" settings in router queues since the empirical method would detect that a discard condition is approaching. In other words, it would be able to detect situations where discards could occur, such as might happen if more traffic were to be added at that point in time.

In another variation, packet latencies, jitter, and packet dropped rates can be monitored during a connection between endpoints and, based on detecting a downward trend in either parameter, additional test packets can be transmitted to find a better time location in which to move the connection.

Figure 10:
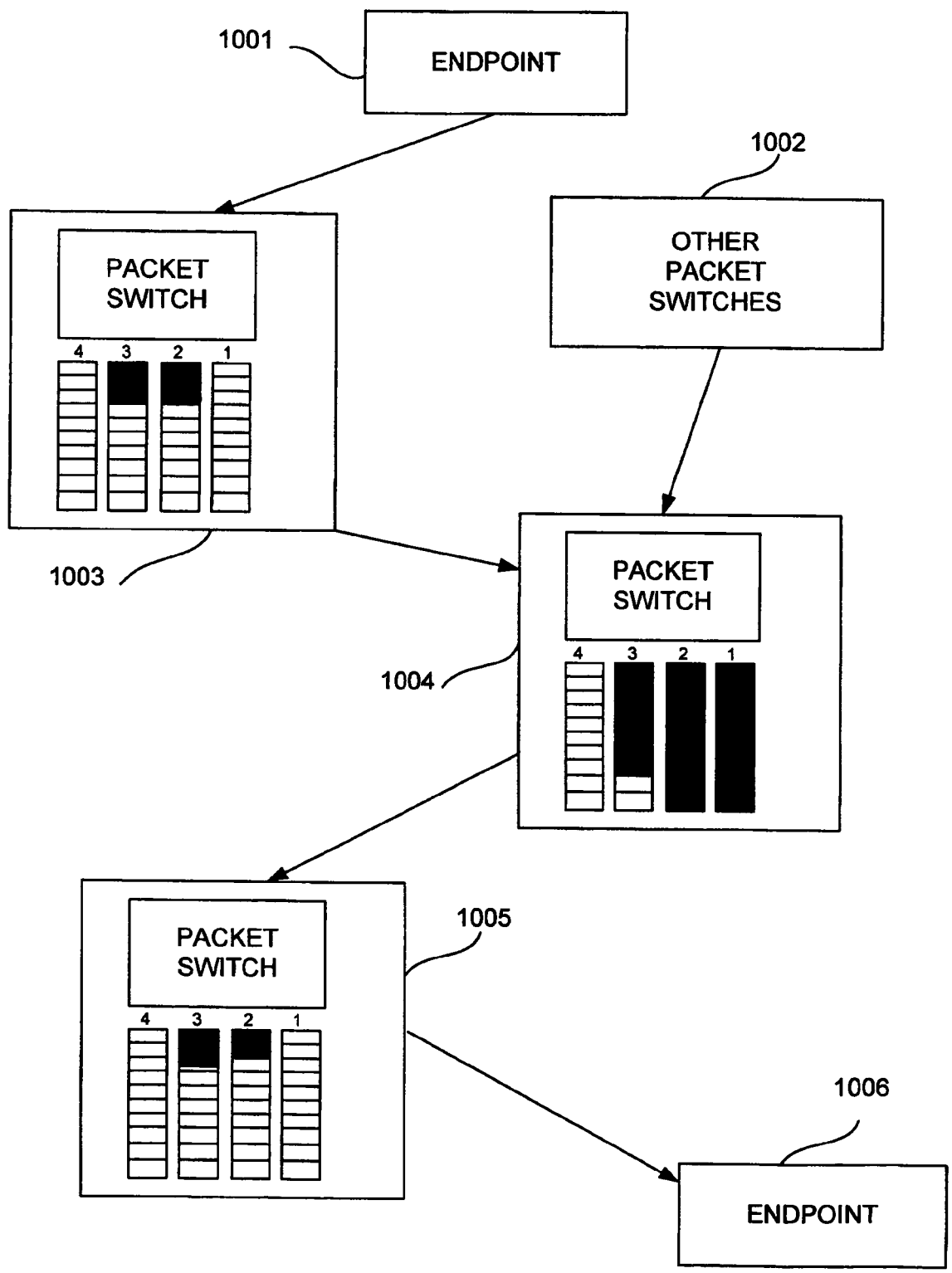
FIG. 10 shows a system wherein queues for realtime traffic (priority 3) are nearly full at one packet switch and yet the traffic still gets through the network.

FIG. 10 shows a system in which a first endpoint 1001 communicates with a second endpoint 1006 through a plurality of packet switches 1003 through 1005. Each packet switch maintains a plurality of packet queues. (As pointed out above, in some devices separate queues may be maintained for each output port). For illustrative purposes, four different priority levels are shown, wherein 4 is the highest level, and level 1 is the lowest level. Assume that endpoint 1001 attempts to initiate a connection with endpoint 106 through the network. Endpoint 1001 transmits a plurality of "test" packets using priority level 2. As can be seen, packet switch 1003 is lightly loaded and the queues have no difficulty keeping up with the traffic.

Packet switch 1004, however, is heavily loaded. In that switch, the queue for priority level 1 traffic is full, leading to dropped packets and latencies. Similarly, the test packets transmitted by endpoint 1001 at priority level 2 cause that queue to overflow, causing dropped packets and longer latencies. However, the priority level 3 queue (existing realtime traffic) is not yet full, so those packets are transported through the network unaffected at a given instant in time. In accordance with one variation of the invention, upon detecting that test packets sent during certain time interval locations are dropped and/or suffer from high latencies, endpoint 1001 selects those time locations having either the lowest drop rate and/or the lowest latencies, and uses those locations to schedule the packets (which are then transmitted using level 3 priority).

It is assumed that each endpoint in FIG. 10 comprises a node (i.e., a computer having a network interface) including computer-executable instructions for carrying out one or more of the above-described functions.

B. Negotiated Packet Delivery

In networks that transmit packets using negotiated packet delivery, a transmitting node transmits a query to the intended receiving node. The receiving node responds with a reception map indicating what transmission time interval locations have already been allocated by other transmitting nodes (or, alternatively, what transmission time interval locations are available). The transmitting node then proposes a transmission map to the receiving node, taking into account any time locations previously allocated. The receiving node either accepts the proposed transmission map or proposes an alternate transmission map. Upon agreement between the nodes, the transmitting node begins transmitting according to the proposed transmission map, and the receiving node incorporates the proposed transmission map into its allocation tables. Because the proposed delivery schedule has been agreed to between the two endpoints, uncoordinated contention that might otherwise overflow network switches near the endpoints is avoided. (Because, in some devices, each port has its own queue or queues, traffic on different queues would not conflict). Because the schedule is determined by the two endpoints, no network arbiter is needed to coordinate among network resources. In one embodiment, negotiation occurs only between single LAN switches.

In one embodiment, a transmitting node transmits a bandwidth requirement to an intended recipient node, indicating the bandwidth it requires to support a proposed transmission (e.g., streaming video packets). The intended recipient node, after evaluating time interval locations previously allocated to other transmitters, responds with a proposed delivery schedule indicating time locations during which the transmitter should transmit packets in order to avoid contention with other previously scheduled packets while maintaining the necessary bandwidth for the transmitter. The transmitter thereafter transmits packets according to the proposed delivery schedule.

In yet another variation, a transmitting node transmits a proposed delivery schedule to an intended recipient, indicating time interval locations corresponding to times during which it proposes to transmit packets. The intended recipient either agrees to the proposed delivery schedule, or proposes an alternate delivery schedule that takes into account the transmitter's bandwidth requirements. Upon agreement between the nodes, transmission occurs according to the agreed-upon delivery schedule. The schedule can be released at the end of the transmission.

Returning briefly to FIG. 7, a transmission interval can be partitioned into units and (optionally) subunits of time during which data packets can be transmitted. In the example of FIG. 7, an arbitrary transmission interval one second (a master frame) can be decomposed into subframes each of 100 millisecond duration, and each subframe can be further decomposed into secondary subframes each of 10 milliseconds duration. Each secondary subframe is in turn divided into time interval locations of 1 millisecond duration. (As described previously, the time decomposition could be carried out to any desired level of granularity, and the description is not intended to be limiting in this respect.)

According to one variation, the scheduled delivery scheme applies to prioritized packets in the network; other non-prioritized packets are not included in this scheme. Therefore, in a system that supports only priority traffic and non-priority traffic, the scheduled delivery scheme would be applied to all priority traffic, and ad-hoc network traffic would continue to be delivered on a nonpriority basis. In other words, all priority traffic would be delivered before any nonpriority traffic is delivered.

Figure 11:
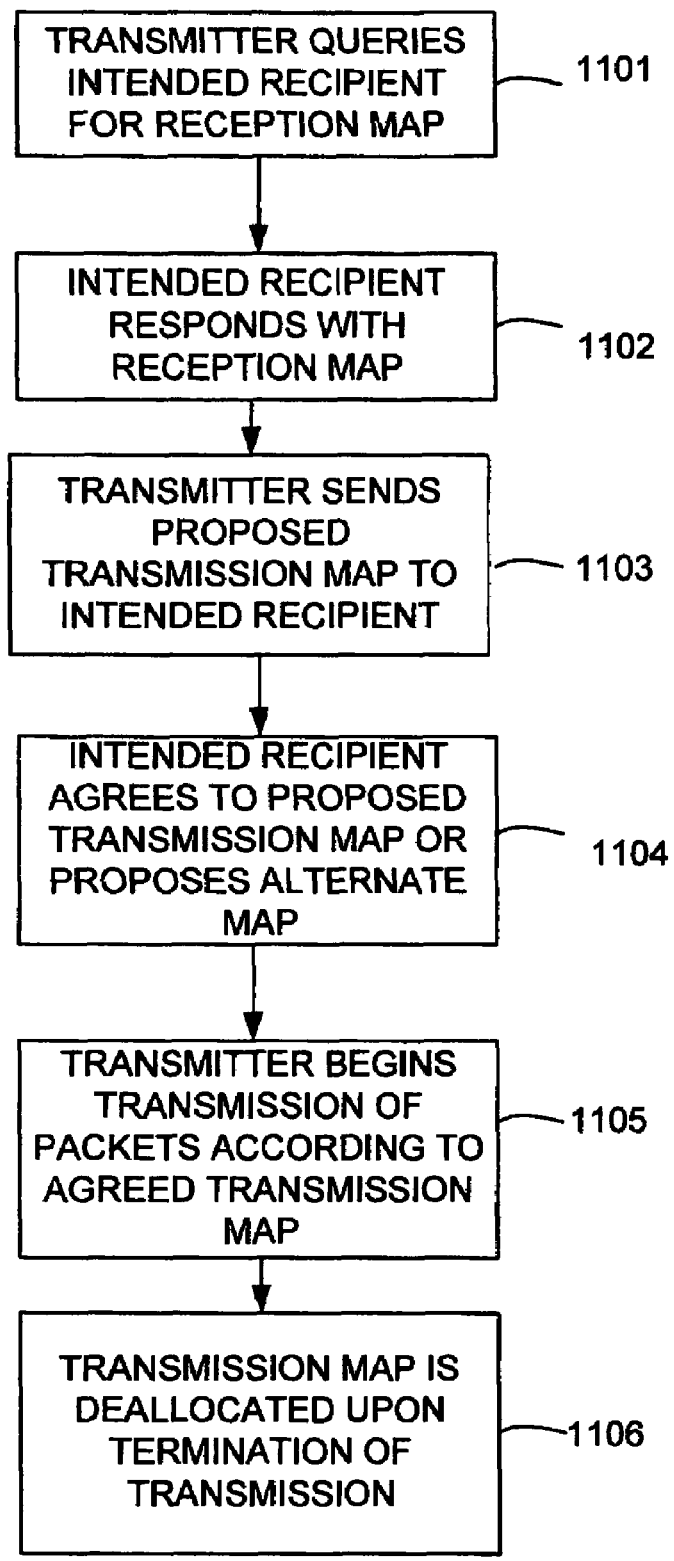
FIG. 11 shows one method for coordinating a negotiated delivery schedule for transmissions between a transmitting node and an intended recipient node on a network such as a LAN.

Returning to FIG. 11, in step 1101, a transmitting node sends a query to an intended receiving node in the network for a reception map. A reception map (see FIG. 14) is a data structure indicating time interval locations that have already been allocated to other transmitters for reception by the receiving node (or, alternatively, time locations that have not yet been allocated, or, alternatively, time locations that are candidates for transmission). More generally, a reception map is a data structure that indicates—in one form or another—time interval locations during which transmission to the intended receiving node would not conflict with other transmitters. Although there are many ways of representing such a map, one approach is to use a bitmap wherein each bit corresponds to one time interval location, and a "1" indicates that the time location has been allocated to a transmitting node, and a "0" indicates that the time location has not yet been allocated. FIG. 11 thus represents 25 time locations of a delivery schedule, and certain time interval locations (indicated by an "x" in FIG. 14) have already been allocated to other transmitters.

Figure 14:
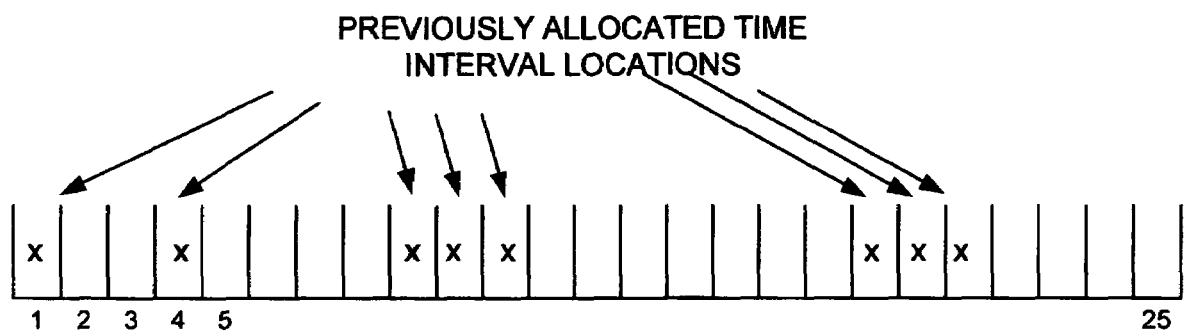
FIG. 14 shows one possible reception map for a given transmission interval.

In step 1102, the intended receiving node responds with a reception map such as that shown in FIG. 14, indicating which time locations have already been allocated to other transmitters. If this were the first transmitter to transmit to that receiving node, the reception map would be empty. It is also possible that time locations could have been previously allocated to the same transmitter to support an earlier transmission (i.e., the same transmitter needs to establish a second connection to the same recipient).

In step 1103, the transmitter sends a proposed transmission map to the intended receiving node. The proposed transmission map preferably takes into account the allocated time locations received from the intended receiving node, so that previously allocated time locations are avoided. The transmitter allocates enough time locations to support the required bandwidth of the transmission while avoiding previously allocated time interval locations.

Suppose that a virtual connection is to be established between two nodes on the network to support a telephone voice connection. A voice-over-IP connection may require 64 kilobits per second transfer rate using 80-byte packet payloads every 10 milliseconds (not including packet headers). A video stream would typically impose higher bandwidth requirements on the network. On an Ethernet LAN, each packet would comprise up to 1,500 bytes.

In step 1104, the intended recipient reviews the proposed transmission map and agrees to it, or proposes an alternate transmission map. For example, if the intended recipient had allocated some of the proposed time locations to another transmitter during the time that the transmitter was negotiating for bandwidth, the newly proposed delivery schedule might present a conflict. In that situation, the intended recipient might propose an alternate map that maintained the bandwidth requirements of the transmitter.

In step 1105, the transmitter repeatedly transmits to the intended recipient according to the agreed delivery schedule. To support a voice-over-IP connection, for example, the transmitter could transmit an 80-byte packet every 10 milliseconds. For a video connection, the transmitter could transmit at a more frequent rate. Finally, in step 1106 the receiver's map is deallocated when the transmitter no longer continues to transmit. Deallocation could instead be performed implicitly by noticing that traffic is no longer being transmitted.

Note that for two-way communication, two separate connections must be established: one for node A transmitting to node B, and another connection for node B transmitting to node A. Although the inventive principles will be described with respect to a one-way transmission, it should be understood that the same steps would be repeated at the other endpoint where a two-way connection is desired.

Figure 12:
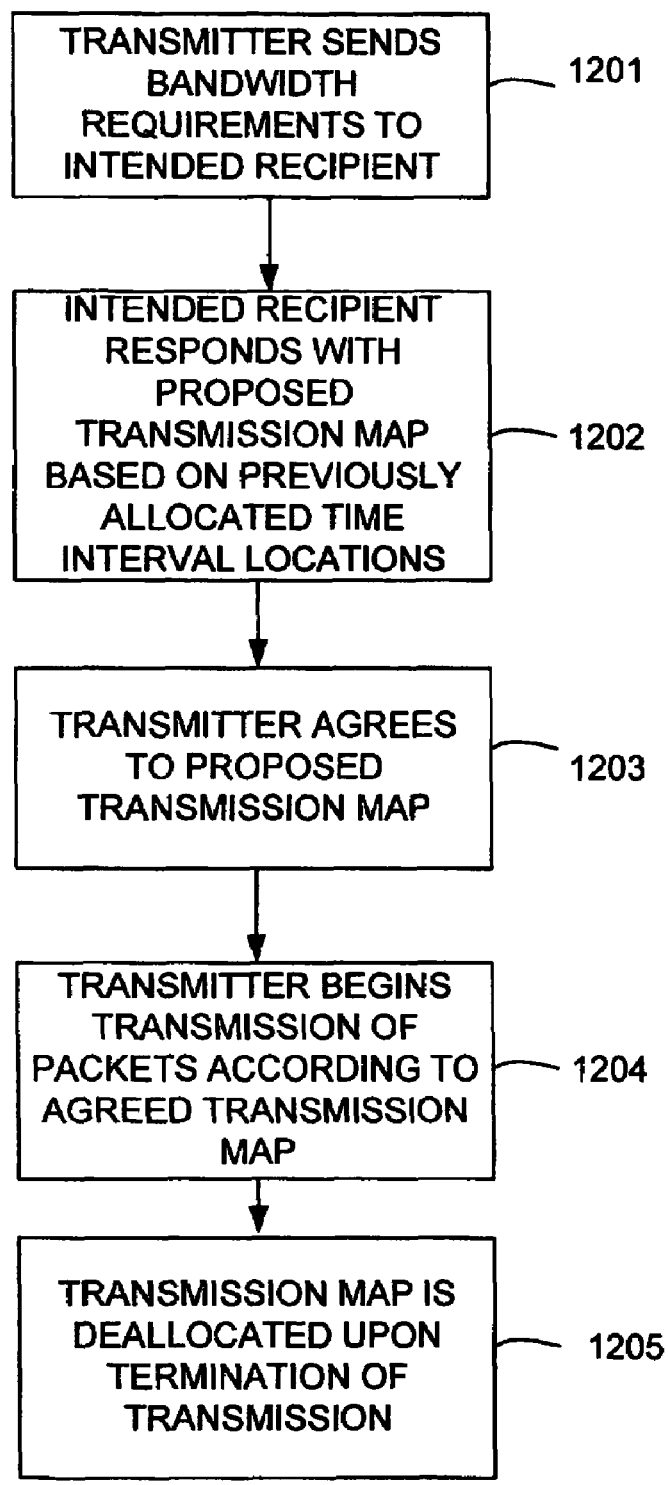
FIG. 12 shows a second method for coordinating a delivery schedule for transmissions between a transmitting node and an intended recipient node.

FIG. 12 shows an alternative method for negotiating packet delivery times. Beginning in step 1201, the transmitter sends a bandwidth requirement to the intended recipient. For example, the transmitter may dictate a packet size and/or bandwidth, and the intended recipient could determine which time locations should be allocated to support that bandwidth. In step 1202, the intended recipient responds with a proposed transmission map that takes into account previously allocated time locations.

In step 1203, the transmitter agrees to the proposed transmission map, causing the intended receiver to "lock in" the agreed time locations (this step could be omitted), and in step 1204 the transmitter transmits packets according to the agreed-upon schedule. Finally, in step 1205 the transmission map is deallocated upon termination of the connection.

Figure 13:
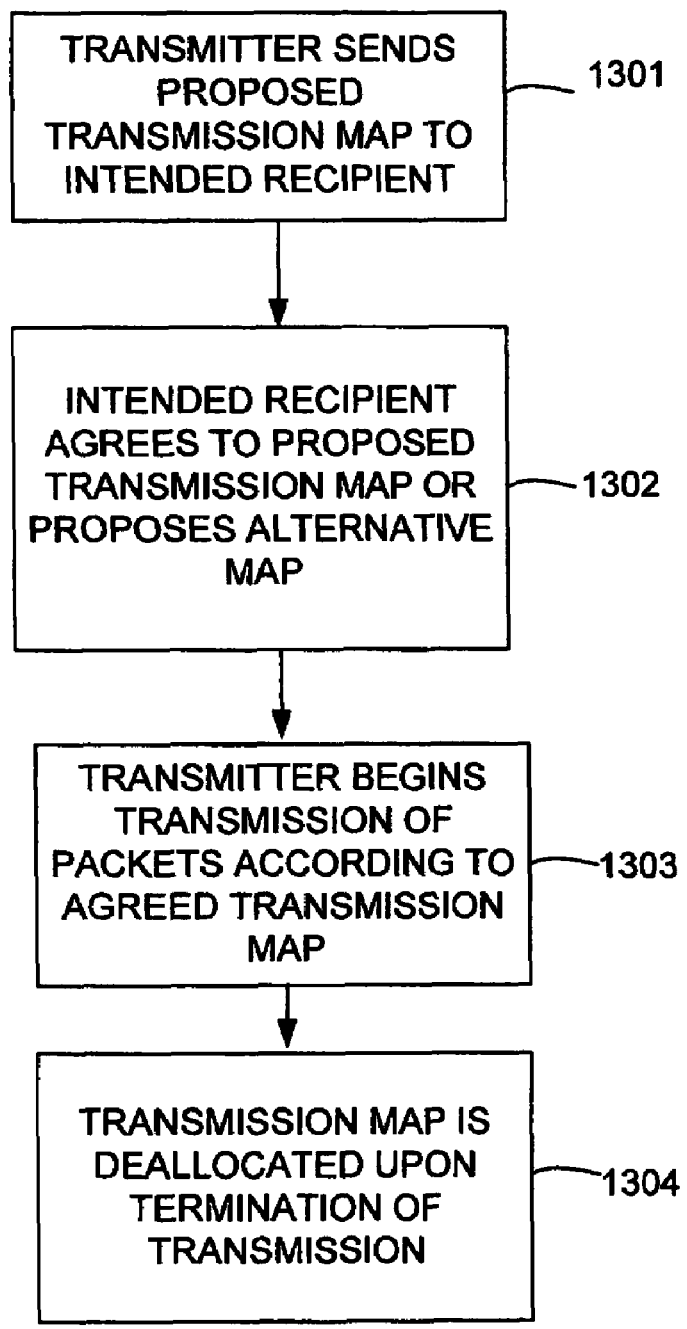
FIG. 13 shows a third method for coordinating a delivery schedule for transmissions between a transmitting node and an intended recipient node.

FIG. 13 shows another variation for negotiated packet delivery. In step 1301, the transmitting node sends a proposed transmission map to the intended recipient. In step 1302, the intended recipient either agrees to the proposed transmission map (if it is compatible with any previously-allocated maps) or proposes an alternative map that meets the transmitter's bandwidth requirements, which can be inferred from the proposed transmission map. For example, if the transmitter had proposed transmitting in time locations 1, 11, 21, 31, 41, and so forth, it would be evident that the transmitter needed to transmit once every tenth time interval. If the requested locations were not available, the intended recipient could instead propose time locations 2, 12, 22, 32, and so forth.

In step 1303, the transmitter transmits packets according to the agreed-upon delivery schedule, and in step 1304 the transmission map is deallocated upon termination of the transmission.

In another variation, a transmitter may request bandwidth (e.g., one 1000-byte packet every 10 milliseconds) and the receiver responds with a placement message (e.g., start it at the 75th time location). The receiver could also respond with multiple alternatives (e.g., start it at the 75th, the 111th, or the 376th time location). The transmitter would respond with the time interval location that it intended to use (e.g., the 111th), and begin transmission. This variation is intended to be within the scope of sending "transmission maps" and "reception maps" as those terms are used herein.

Figure 15:
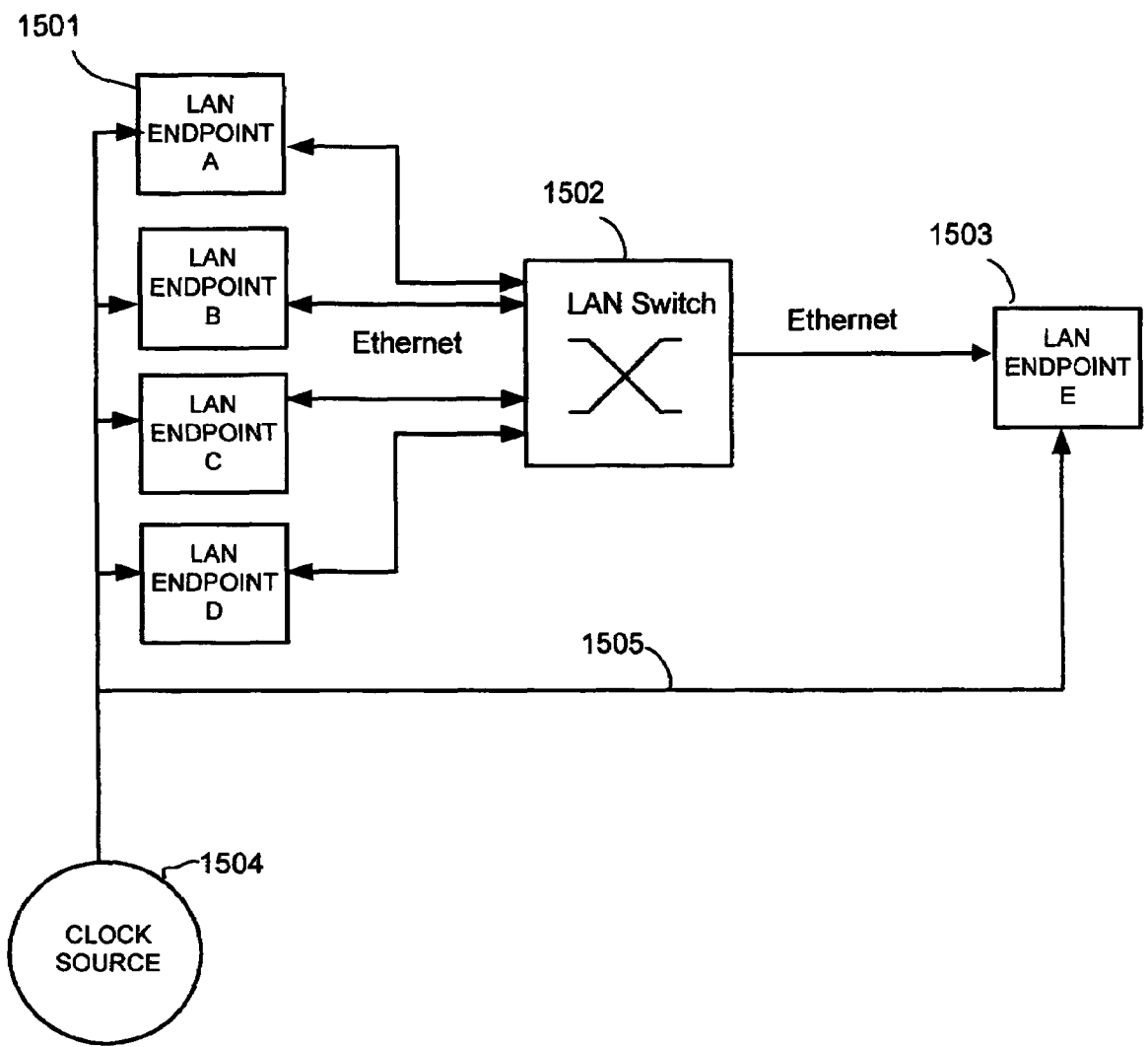
FIG. 15 shows a scheme for synchronizing delivery schedules among network nodes.

In order for each transmitter and receiver to agree on a delivery schedule, it is desirable to develop and maintain some time synchronization between the nodes. FIG. 15 shows one possible approach for synchronizing delivery schedules among nodes in a network.

As shown in FIG. 15, the network comprises various endpoints connected through a switch 1502. According to one variation of the invention, a clock source 1504 (e.g., a GPS-derived clock) is coupled through an electrical wire 1505 to each network node participating in the scheduled delivery scheme. The clock source generates pulses that are transmitted to each node and used as the basis for deriving the delivery schedule. Each node may comprise a timer card or other mechanism (e.g., an interrupt-driven operating system) that is able to use the timing signals to establish a common reference frame. This means for synchronizing may therefore comprise a physical wire (separate and apart from the network) over which a synchronization signal is transmitted to each node. It may further comprise a hardware card and/or software in each node to detect and decode the synchronization signal.

The clock pulses may comprise a pulse according to an agreed-upon interval (e.g., one second) that is used by each node to generate time locations that are synchronized to the beginning of the pulses. Alternatively, the clock source may generate a high-frequency signal that is then divided down into time locations by each node. Other approaches are of course possible. As yet another alternative, each node may contain its own clock source that is synchronized (via GPS or other means) to a common reference signal, such as a radio signal transmitted by the U.S. Government. Wire 1505 may comprise a coaxial cable or other means of connecting the clock source to the nodes. In one variation, the connection is of a short enough distance (hundreds of feet) so that transmission effects and delays are avoided. Any of these means for synchronizing may be used independently of the others.

Another way or means of synchronizing time locations and delivery schedules among the nodes is to have one node periodically transmit (e.g., via multicast) a synchronization packet on the node on the network. Each node would receive the packet and use it to synchronize an internal clock for reference purposes. As an alternative to the multicast approach, one network node can be configured to individually send synchronization packets to each participating network node, taking into account the stagger delay involved in such transmission. For example, a synchronization node would transmit a synchronization packet to a first node on the network, then send the same packet to a second node on the network, which would be received later by the second node. The difference in time could be quantified and used to correct back to a common reference point. Other approaches are of course possible.

Figure 16:
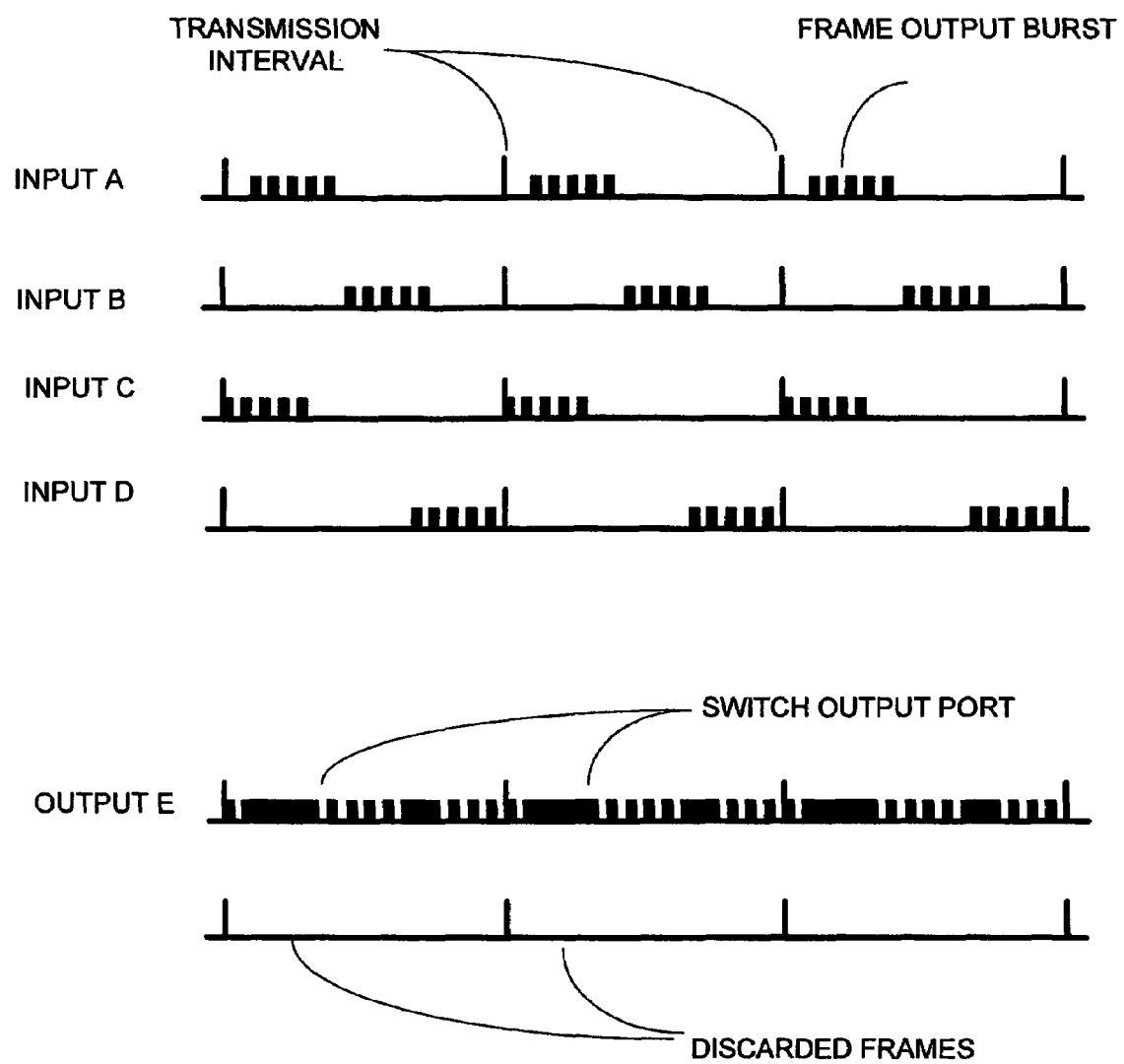
FIG. 16 shows how network congestion is avoided through the use of the inventive principles, leading to more efficient scheduling of packets in the network.

FIG. 16 illustrates how the negotiated packet delivery scheme can reduce congestion by more efficiently scheduling data packets between transmitters and receivers. As shown in FIG. 16, because each transmitting node schedules packets for delivery during times that do not conflict with those transmitted by other nodes, no packets are lost.

C. Network Connection Device

Figure 1:
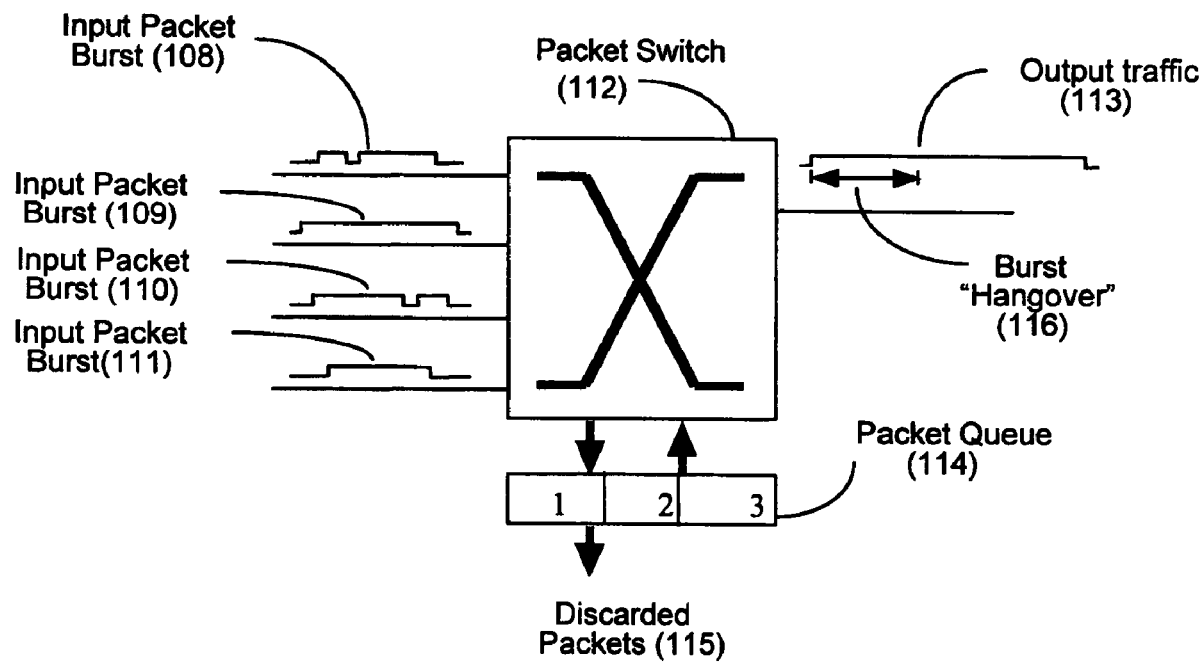
FIG. 1 shows the problem of bursty packets creating an overflow condition at a packet switch, leading to packet loss.
Figure 2:
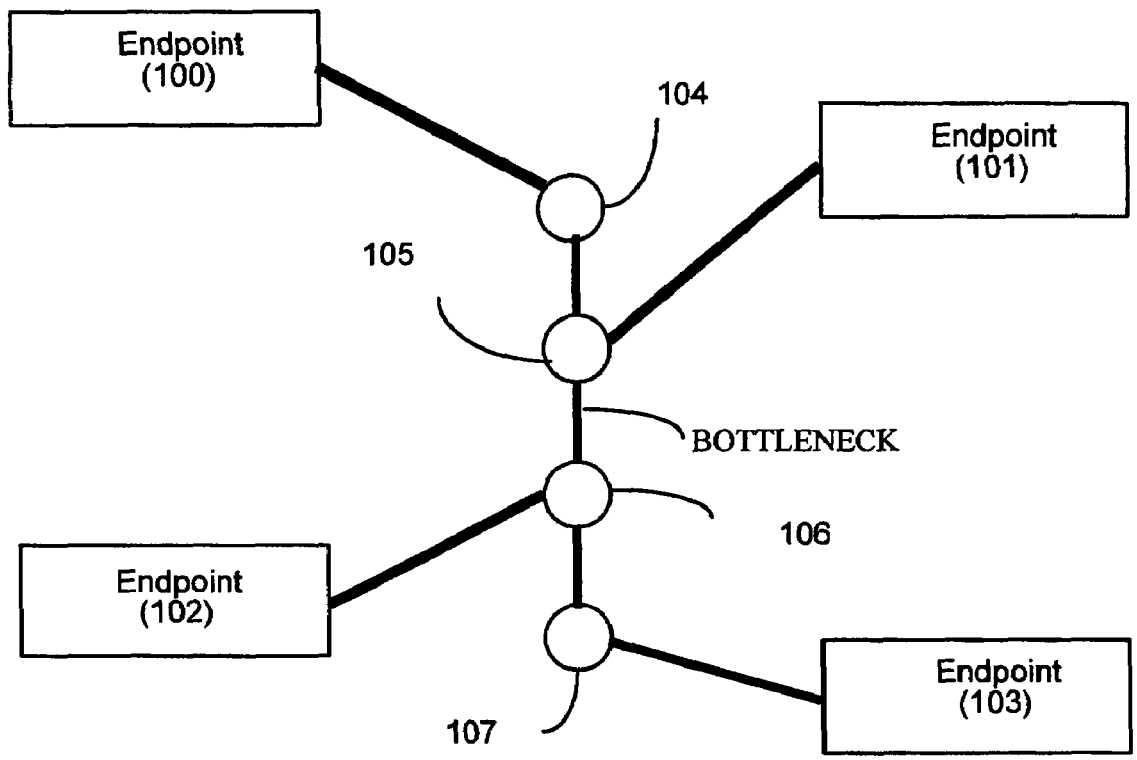
FIG. 2 shows how network congestion can lead to a bottleneck where two sets of endpoints share a common network resource under bursty conditions.
Figure 3:
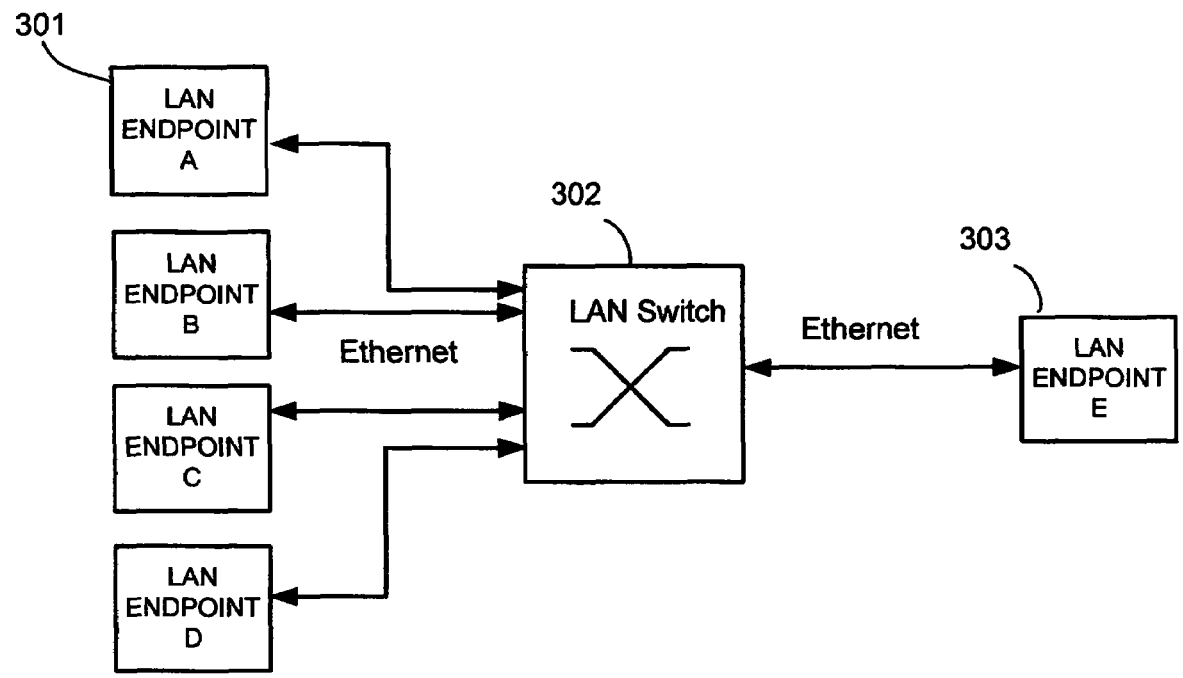
FIG. 3 shows four LAN endpoints communicating with another LAN endpoint through a LAN switch, potentially leading to congestion in the switch.
Figure 4:
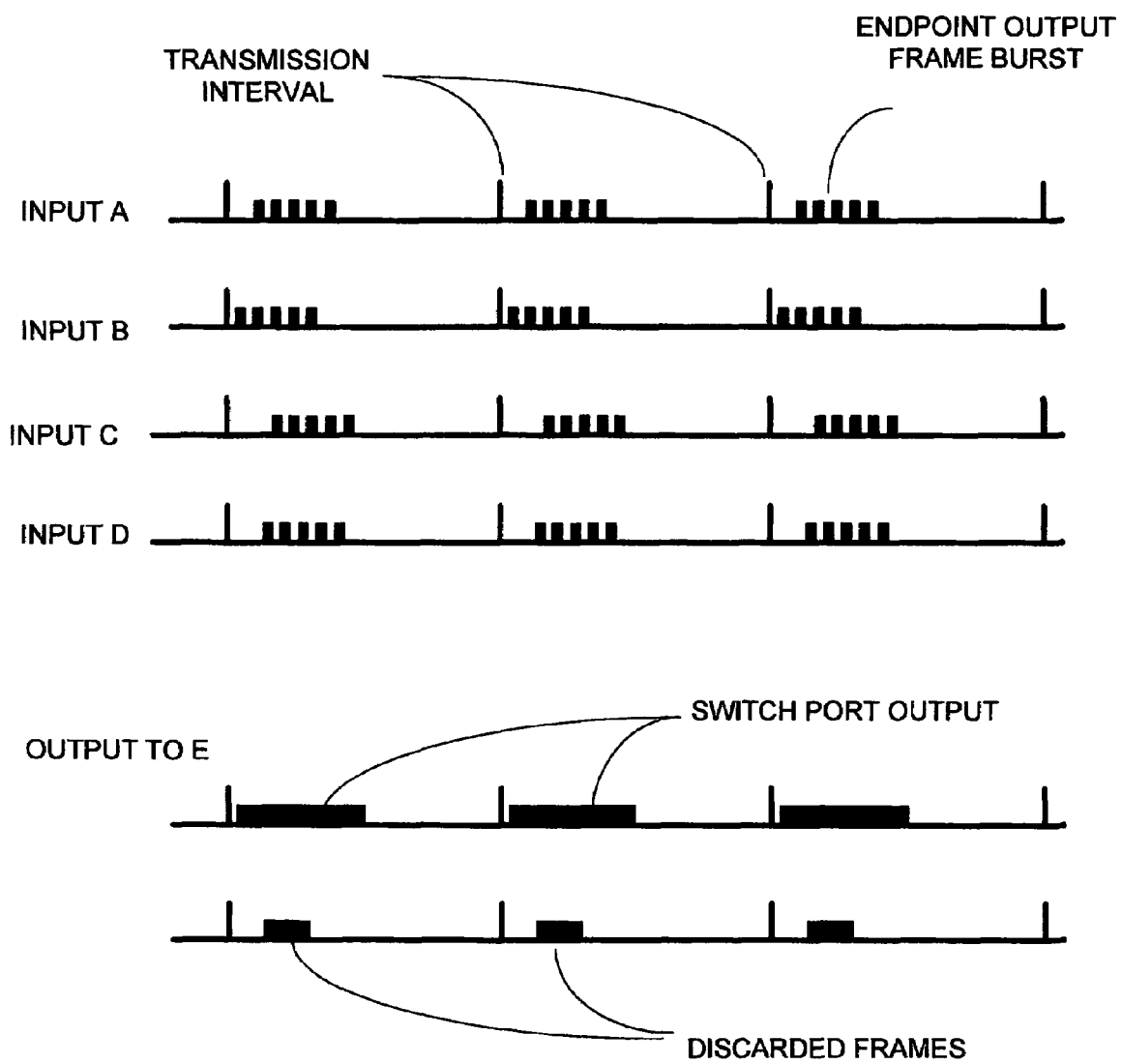
FIG. 4 shows a problem of packet (frame) loss due to congestion in the LAN switch of FIG. 3.
Figure 5:
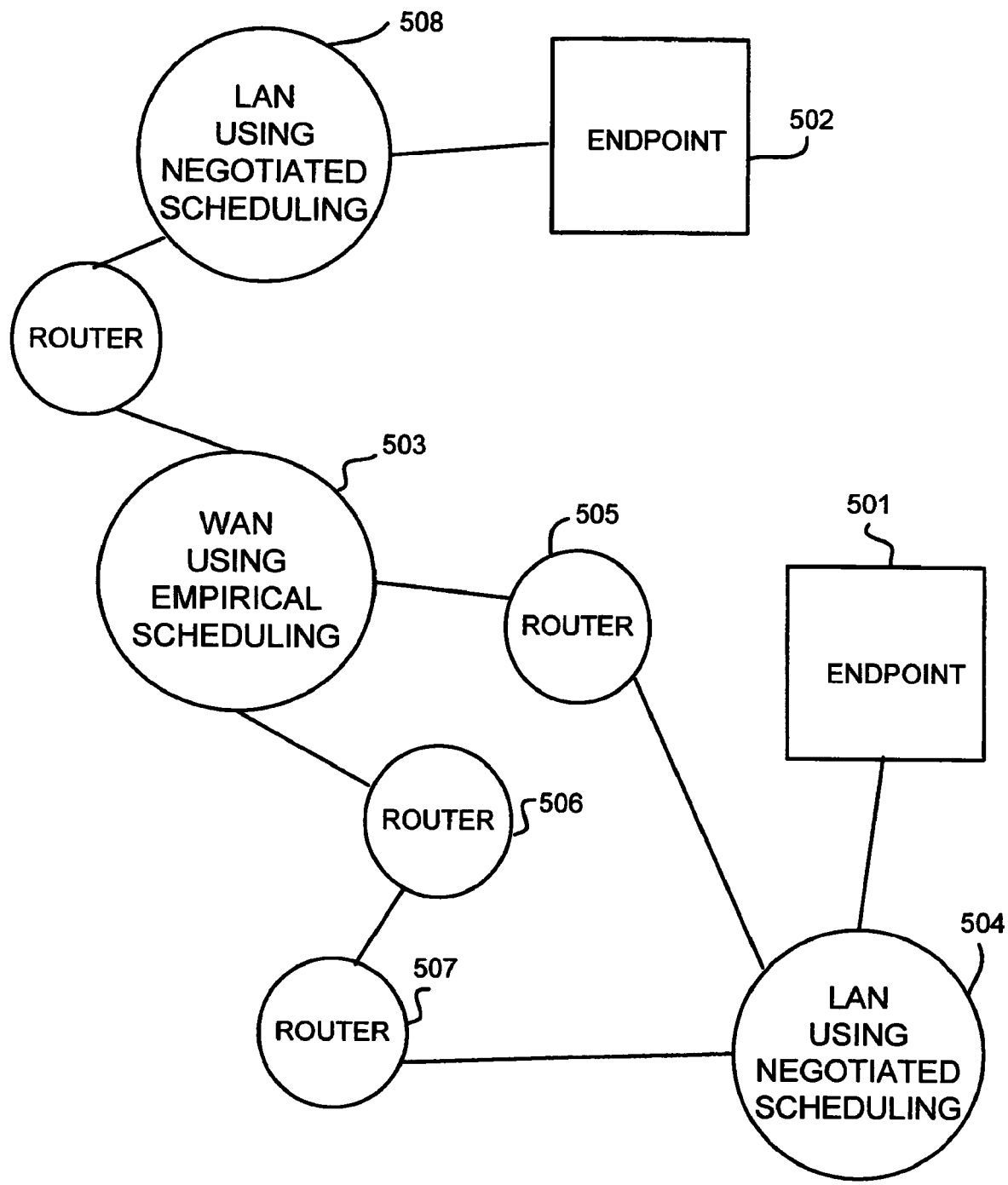
FIG. 5 shows two interconnected networks including WAN 503, which uses an empirically scheduled packet scheduling technique, and LAN 504, which uses a negotiated packet scheduling technique.

Having reviewed the principles of a network that uses an empirically scheduled packet delivery scheme and a network that uses a negotiated packet delivery scheme, reference will again be made to FIG. 5, which illustrates the problem where two endpoints 501 and 502 must communicate over different types of networks. According to one variation of the invention, a network connection device (NCD) is provided for facilitating virtual connections between endpoints across the different networks.

Figure 17:
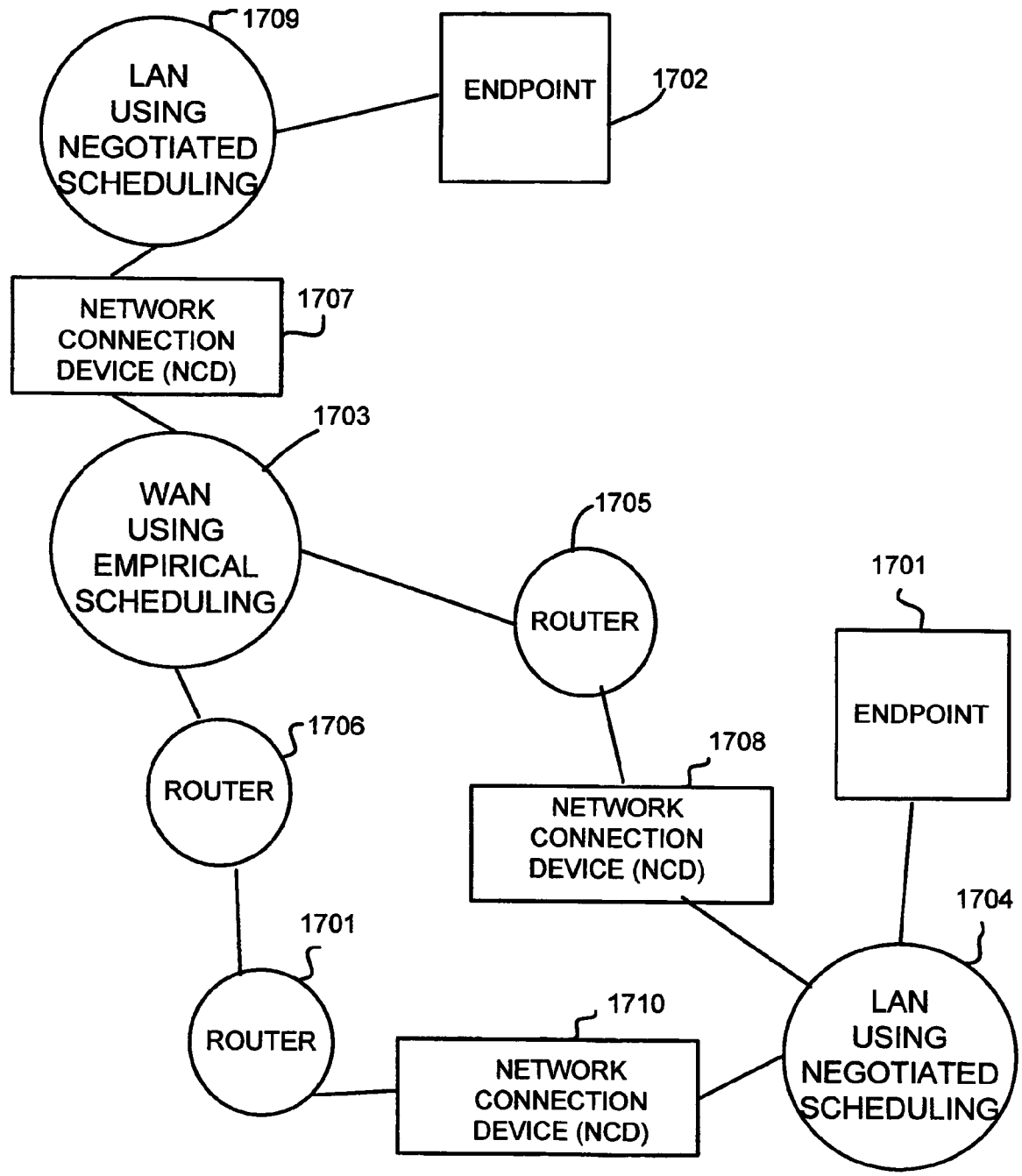
FIG. 17 shows a system including a network connection device (NCD) according to one variation of the invention.

FIG. 17 shows a system including one or more network connection devices (NCDs) 1707, 1708, and 1710 according to one variation of the invention. Network connection device 1708 bridges first network 1704 (in this case, a LAN that uses a negotiated packet scheduling technique for transmitting packets to other nodes) and second network 1703 (in this case, a WAN using an empirical scheduling technique). In this respect, NCD 1708 acts as a proxy between network 1704 and network 1703, translating packet delivery protocols in order to allow communication between different packet scheduling techniques. NCD 1710 also connects LAN 1704 to WAN 1703 through routers 1701 and 1706. Similarly, NCD 1707 bridges LAN 1709 and WAN 1703.

Although each NCD is shown as a separate device, the functions of each NCD as described below can be implemented using software and/or hardware (e.g., PLDs, PALs, etc.) added to existing network devices, such as routers or other elements. The NCD functions can also be implemented in access aggregation devices, such as a DSLAM (DSL Access Multiplexer), which is a device that aggregates multiple DSL lines into a larger network structure. Accordingly, the term "network connection device" or NCD should be understood to connote a device that performs NCD-like functions, regardless of the specific hardware, software, or network element in which those functions are implemented.

When endpoint 1701 needs to communicate with endpoint 1702, it attempts to initiate a negotiated packet delivery schedule with endpoint 1702. The delivery protocol in LAN 1704 can determine, based on the IP address of requested endpoint 1702, that endpoint 1702 does not reside within LAN 1704, and thus determines that it must be accessed by routing the request through NCD 1708. Therefore, the protocol routes the request to NCD 1708, which determines that endpoint 1702 must be accessed through NCD 1707, which is over an empirically scheduled WAN 1703. Consequently, NCD 1708 initiates an empirically determined protocol (see section A above) with NCD 1707 over WAN 1703. In other words, it sends test packets to NCD 1707 and empirically determines which time locations would be most advantageous to avoid overloading routers in the path leading to NCD 1707. NCD 1708 then returns these empirically determined time locations to endpoint 1701 as an alternate transmission map according to the negotiated packet delivery protocol (see section B above). Similarly, NCD 1707 establishes a negotiated time location delivery schedule with endpoint 1702 to complete the path over LAN 1709.

In one embodiment, the endpoints must conform to the empirically determined time interval locations, since it may be difficult to force the WAN to accept time intervals that are not empirically desirable. However, it may not be necessary to follow this restriction in all systems.

In addition to acting as a proxy between the networks, each NCD may perform other optional functions, such as (1) protecting each network from unauthorized higher priority traffic that has been improperly introduced into the network; (2) encryption/decryption of packets; (3) network address translation (NAT); (4) proxy IP addressing; (5) firewall protection; and (6) controlling total and individual flows by bandwidth, type, etc. in order to prevent overloading of network choke points. In some embodiments, a router can be placed on either side of the NCD 1708, or the NCD functions can instead be incorporated into a router. Some or all of these functions, described in more detail below, can be implemented in software executing on a general-purpose computer.

Figure 18:
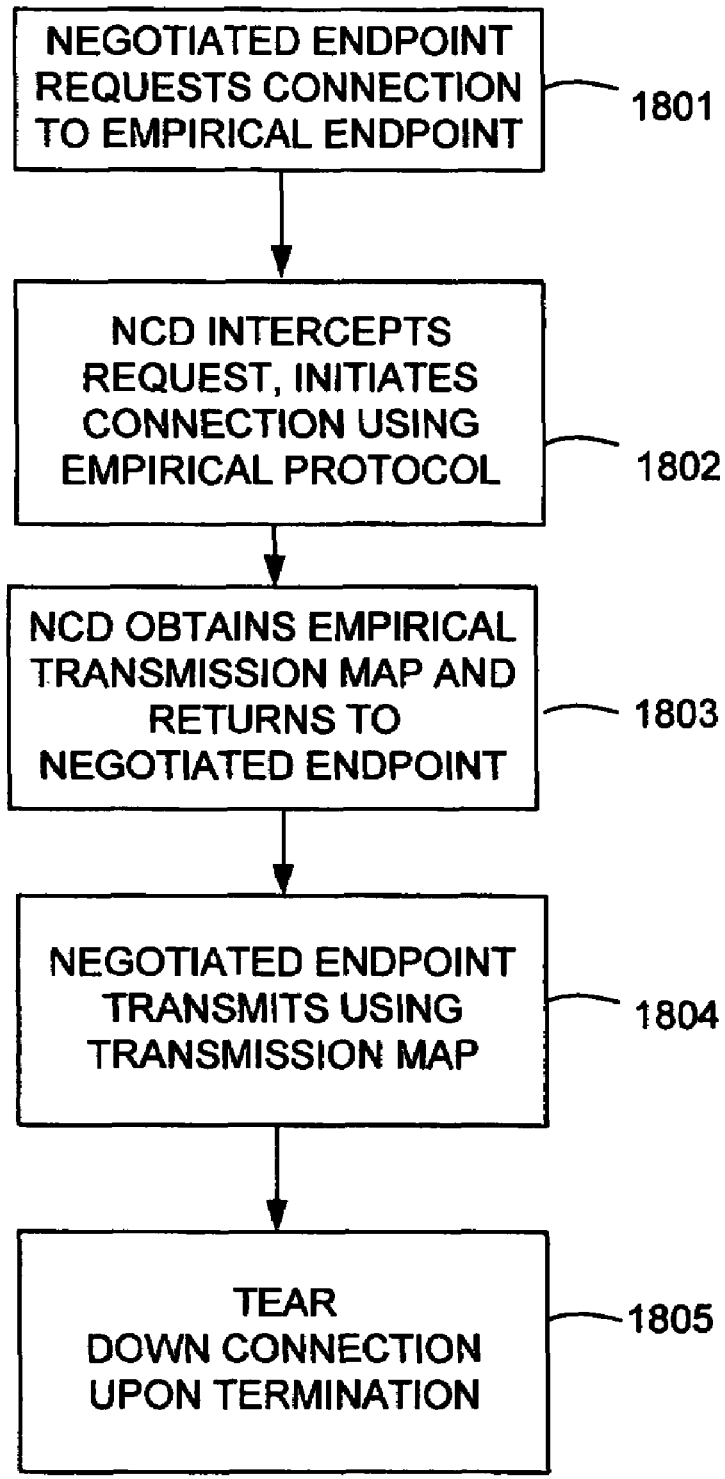
FIG. 18 shows steps of a method for initiating a connection between an endpoint in a negotiated packet delivery network with an endpoint in an empirically scheduled packet delivery network.

FIG. 18 shows steps of a method for initiating a connection between an endpoint in a negotiated packet delivery network with an endpoint in another network that must traverse an empirically scheduled packet network, such as WAN 1703.

In step 1801, a negotiated delivery endpoint (e.g., endpoint 1701 in LAN 1704) requests a virtual connection (e.g., a voice-over-IP circuit) to an endpoint which is in a network that can only be reached via an empirically scheduled network (e.g., endpoint 1702 via WAN 1703). Based on the IP address of the requested endpoint, the network protocol in LAN 1704 is able to determine that the endpoint is not located in LAN 1704, but instead must be accessed through NCD 1708. Consequently, it sends the request to NCD 1708 (e.g., through a router not shown in FIG. 17).

In step 1802, NCD 1708 receives the request, which as described in section B above may include a proposed transmission map, or a bandwidth request for an associated transmission map to be provided by the intended recipient. Thereafter, NCD 1708 initiates a connection with NCD 1707 using the empirically scheduled delivery scheme described above in section A. In other words, NCD 1708 sends test packets in various time locations to NCD 1707 and empirically determines which time locations would be advantageous for transmission. Furthermore, NCD 1707 initiates a negotiated delivery schedule with endpoint 1702 that is consistent with the empirically determined time locations between NCD 1707 and 1708.

In step 1803, NCD 1708 obtains the empirical data and converts it into a negotiated transmission map (see, e.g., FIG. 14) and returns it to endpoint 1701. If endpoint 1701 had proposed a certain transmission map that coincided with favorable empirical data, then NCD could indicate that the proposed transmission map was accepted. If endpoint 1701 had proposed a certain transmission map that was not consistent with the empirically determined advantageous time locations, then NCD 1708 would return an alternate transmission map consistent with the empirical data. If endpoint 1701 had instead requested a bandwidth, NCD could propose a transmission map that met the bandwidth requirement and that was consistent with empirical scheduling determination.

In step 1804, the negotiated endpoint thereafter transmits to endpoint 1702 according to the transmission map received from NCD 1708.

In step 1805, the connection is torn down by NCD 1708 when one or the other endpoint requests termination of the circuit.

For a two-way connection, an endpoint in an empirically scheduled network may need to set up a connection to an endpoint in a negotiated delivery network. Therefore, the steps shown in FIG. 18 will be repeated in reverse (from endpoint 1702 to endpoint 1701) in order to establish two-way communication, such as might be required for a voice-over-IP connection.

Figure 19:
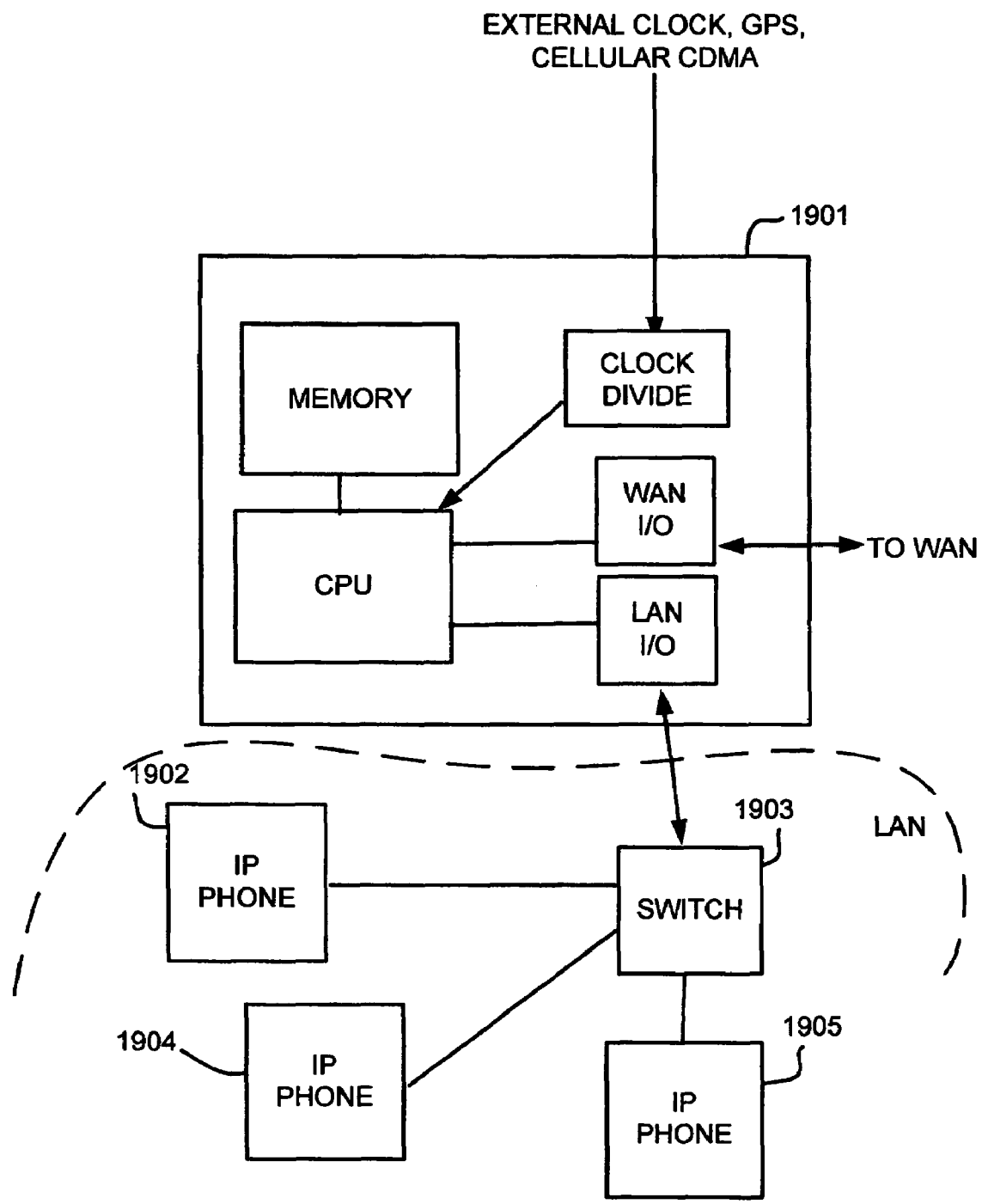
FIG. 19 shows one possible configuration for a network connection device (NCD).

FIG. 19 shows one possible configuration for an NCD. The unit 1901 may include a memory, a CPU, and I/O circuitry. The CPU is programmed with software to carry out the functions described above and shown in FIG. 18. The I/O circuitry may be coupled to a switch 1903 which is in turn coupled to various devices such as IP phones which can be used to establish two-way connections using the principles outlined above. The device 1901 may receive timing from an uplink and/or an external clock source, such as from a GPS or cellular CDMA source.

It should also be understood that the phase of all frames may be independent from one another; they need only be derived from or aligned with a common clock. Different endpoints need not have frames synchronized in phase with each other. In other words, each time interval need not be uniquely identified among different endpoints, as long as the time intervals remain in relative synchronicity. This principle is shown with reference to FIG. 20, which shows how two endpoints can refer to a time interval specified with reference to frames that have a different phase but which are referenced to a common clock. (It is not necessary that the endpoints actually be synchronized to a common clock, although FIG. 20 shows this for each of understanding).

Figure 20:
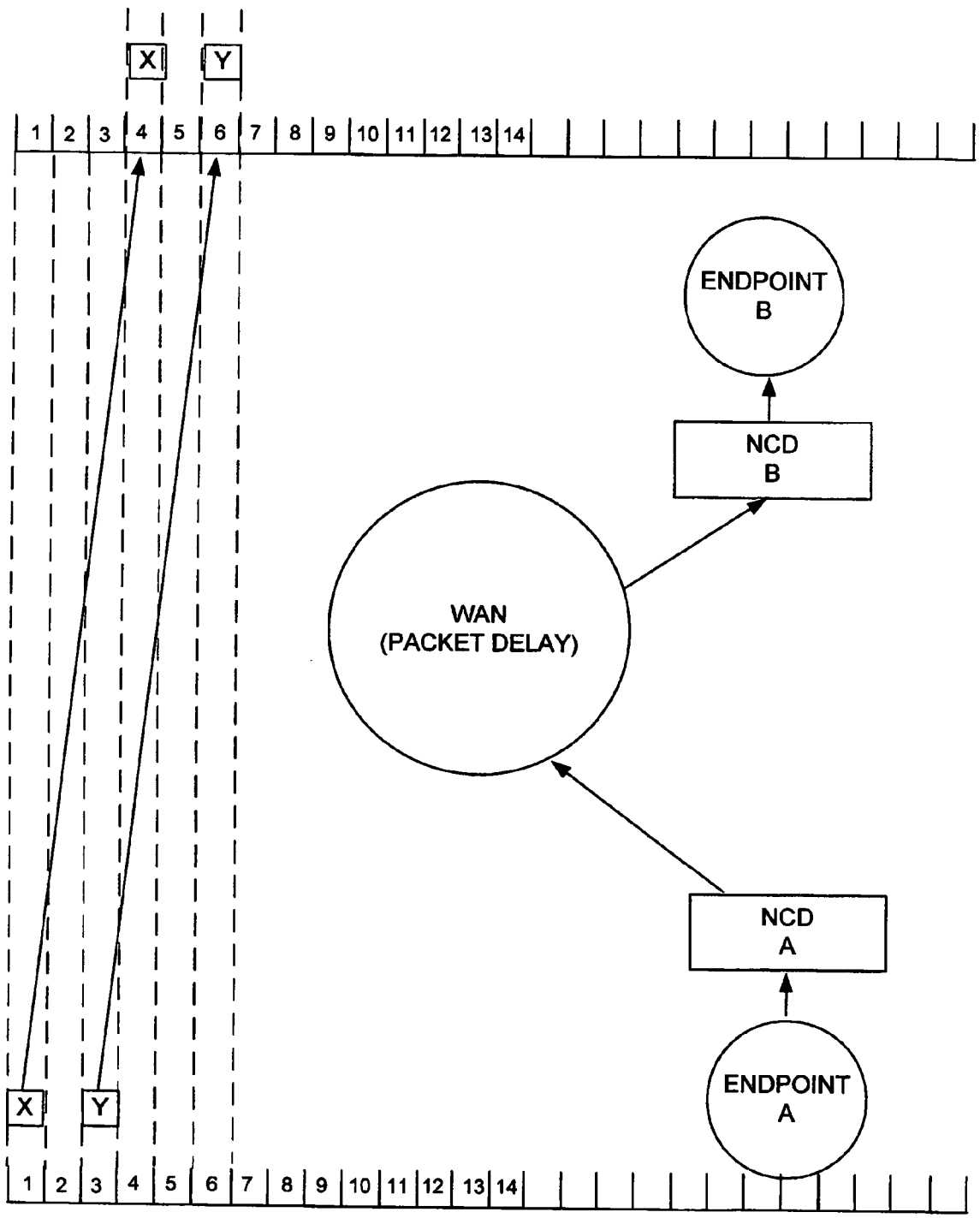
FIG. 20 shows how two endpoints can refer to a time interval specified with reference to frames that have a different phase but which are referenced to a common clock.

As shown in FIG. 20, suppose that endpoint A (bottom of FIG. 20) needs to communicate with endpoint B (top of FIG. 20) through a WAN that introduces a packet delay. Each endpoint has an associated NCD that handles the connection with the WAN. Suppose also that the timeline across the top of FIG. 20 and the timeline across the bottom of FIG. 20 represent "absolute" time; i.e., time interval 1 at the top of FIG. 20 appears at the same instant in absolute time as time interval 1 at the bottom of FIG. 20. Suppose further that NCD A transmits a first test packet X across the network during interval 1 and a second test packet Y across the network during interval 3. Due to the packet delay introduced by the WAN, test packet X will not arrive at endpoint B until what endpoint B perceives to be time interval 4. Similarly, test packet Y will not arrive at endpoint B until what endpoint B perceives to be time interval 6. Yet endpoints A and B (through their respective network connection devices NCD A and NCD B) need to agree on what time interval future packets will be transmitted.

In short, when NCD B determines that test packet X was received with minimal delay, it informs NCD A that the test packet identified as "packet X" was empirically favorable for future transmissions. Thus, NCD A identifies the relevant time interval as interval 1, whereas NCD B identifies the relevant time interval as interval 4. Similarly, NCD A identifies the relevant time interval for packet Y as interval 3, whereas NCD B identifies the relevant time interval for packet Y as interval 6. As long as the timeline at the top of FIG. 20 and the timeline at the bottom of FIG. 20 do not move relative to each other, the system can accommodate packet, delays and can agree on what time interval locations should be used to transmit packets. Other approaches can of course be used.

Although not explicitly shown above, the networks may include one or more soft phone switches (essentially a small computer coupled to the network) that maintains a database of phone numbers and maps them to IP addresses. To make a phone call to an intended recipient, the phone switch is contacted to determine the IP address corresponding to the recipient's telephone number. The inventive system and method may also be employed with video terminals to transmit video-grade data across networks; computer terminals that transmit computer data; or any other type of data.

Any of the method steps described herein can be implemented in computer software and stored on computer-readable medium for execution in a general-purpose or special-purpose hardware or processor (PLDs, PGAs, routers, switches, etc.) or computer, and such computer-readable media is included within the scope of the intended invention. The term "processor" as used herein should be understood to include any of these various types of devices. Numbering associated with method or process steps in the claims is for convenience only and should not be read to require a particular ordering or sequence

The invention claimed is:

1. A method of transmitting data packets across a first network, comprising the steps of:
    (1) receiving at a network intermediary device from an originating node on the first network a request to establish a connection with a destination node, the request comprising an attempt to initiate a negotiated packet delivery scheme for delivery of data packets;
    (2) determining that the data packets are destined for a destination node that is accessible via a second network separated from the first network by one or more packet routing devices;
    (3) using an empirically scheduled packet delivery mechanism to identify empirically determined time locations for delivering packets to the destination node;
    (4) generating at the network intermediary device a negotiated packet delivery schedule for communication between the originating node and the destination node that is compatible with the empirically determined time locations; and
    (5) transmitting the negotiated packet delivery schedule to the originating node.

2. The method of claim 1, wherein the first network comprises a local area network, and wherein the second network comprises a wide-area network.

3. The method of claim 1, wherein step (3) comprises the steps of:
    (a) transmitting a plurality of test packets in different time interval locations over the second network;
    (b) evaluating one or more of a packet latency rate, a jitter level, or a loss rate associated with the test packets; and
    (c) selecting one or more time interval locations having a favorable packet latency rate, jitter level, or loss rate.

4. The method of claim 1, wherein step (1) comprises the step of receiving a proposed transmission schedule from the originating node for the delivery of packets in the first network.

5. The method of claim 1, wherein step (1) comprises the step of receiving a bandwidth request from the originating node for the delivery of packets in the first network.

6. The method of claim 1, wherein step (3) is performed in a device external to the first network.

7. The method of claim 1, further comprising the step of repeating steps (1) through (5) for a second originating node on a third network that is coupled to the second network.

8. The method of claim 1, further comprising the step of establishing time phase synchronization of packets transmitted over the first and second networks.

9. The method of claim 8, wherein the step of establishing time synchronization comprises the step of using a Global Positioning System (GPS) receiver.

10. A computer-readable medium comprising computer instructions which, when executed by a processor, perform the steps of:
    (1) receiving at a network intermediary device from an originating node on a first network a request for a connection for delivering data packets to a destination node, the request comprising a request to initiate a negotiated packet delivery scheme;
    (2) determining that the data packets are intended for a destination node located across a second network separated from the first network by one or more packet routing devices;
    (3) using an empirically scheduled packet delivery mechanism to identify empirically determined time locations for delivering packets to the destination node;
    (4) generating at the network intermediary device a negotiated packet delivery schedule for communication between the originating node and the destination node that is compatible with the empirically determined time locations; and
    (5) transmitting the negotiated packet delivery schedule to the originating node.

11. The computer-readable medium of claim 10, wherein the computer instructions perform the further steps of:
    (a) transmitting a plurality of test packets in different time interval locations over the second network;
    (b) evaluating one or more of a packet latency rate, a jitter level, or a loss rate associated with each different time interval location; and
    (c) selecting one or more time interval locations having a favorable packet latency rate, jitter level, or loss rate.

12. The computer-readable medium of claim 10, wherein step (1) comprises the step of receiving a proposed transmission schedule from the originating node for the delivery of packets in the first network.

13. The computer-readable medium of claim 10, wherein step (1) comprises the step of receiving a bandwidth request from the originating node for the delivery of packets in the first network.

14. The computer-readable medium of claim 10, wherein the computer instructions perform the further step of repeating steps (1) through (5) for a second originating node on a third network that is coupled to the second network.

15. The computer-readable medium of claim 10, wherein the computer instructions perform the further step of establishing time phase synchronization with a device located on the second network, such that data packets transmitted over the second network can be synchronized relatively in time over the network.

16. A communication intermediary device comprising a memory and a processor, the device configured to perform the steps of:
    (1) receiving at the communication intermediary device, from an originating node in a first network having one or more nodes configured to create connections by negotiating with each other to establish negotiated time interval locations during which packets will be transmitted, a request to establish a connection with a destination node that is accessible via a second network having one or more nodes configured to create connections by empirically determining time interval locations during which packets will be transmitted;
    (2) in response to step (1), sending a plurality of packets across the second network and identifying therefrom one or more empirically determined time interval locations on the second network that are desirable for sending data packets;
    (3) generating at the communication intermediary device a negotiated packet delivery schedule for communication between the originating node and the destination node that is compatible with the empirically determined time interval locations; and
    (4) transmitting the negotiated packet delivery schedule to the originating node.

17. The communication intermediary device of claim 16, wherein step (2) comprises simultaneously transmitting a plurality of packets over a plurality of candidate time interval locations.

18. The communication intermediary device of claim 16, wherein step (2) comprises sequentially transmitting a plurality of packets over a plurality of candidate time interval locations.

19. The communication intermediary device of claim 16, further comprising means for synchronizing time interval locations with a second device coupled to the second network.

20. The communication intermediary device of claim 19, wherein the means for synchronizing comprises a Global Positioning System (GPS) receiver.

21. The communication intermediary device of claim 16, wherein the processor and memory are located in a router configurable to route data packets in a network.

22. The communication intermediary device of claim 16, wherein the processor and memory are located in a network aggregation device configurable to aggregate data from a plurality of network elements.

23. The method of claim 1, wherein the request received from the originating node comprises a transmission map identifying one or more time interval locations selected by the originating node for transmitting the data packets to the destination node, and wherein the generated negotiated packet delivery schedule comprises an alternative transmission map based on the empirically determined time locations and based on the transmission map received from the originating node.

24. The communication intermediary device of claim 16, wherein the request received from the originating node comprises a transmission map identifying one or more time interval locations selected by the originating node for transmitting the data packets to the destination node, and wherein the generated negotiated packet delivery schedule comprises an alternative transmission map based on the empirically determined time interval locations and based on the transmission map received from the originating node.

25. The method of claim 1, wherein the first network and the second network are Internet Protocol (IP) or Ethernet packet-switched networks.

26. The communication intermediary device of claim 16, wherein the first network and the second network are Internet Protocol (IP) or Ethernet packet-switched networks.

27. The method of claim 3, wherein each of the plurality of test packets has a priority level that is lower than a priority level assigned to data packets that are to be transmitted between nodes on the second network.

28. The method of claim 3, wherein the different time interval locations correspond to candidate times during which data packets may be transmitted between nodes on the second network.

29. The communication intermediary device of claim 16, wherein the empirically determined time interval locations correspond to candidate times during which data packets may be transmitted between nodes on the second network.

30. The method of claim 8, wherein the step of establishing time synchronization comprises the step of using a Code Division Multiple Access (CDMA) source.

31. The communication intermediary device of claim 19, wherein the means for synchronizing comprises using a Code Division Multiple Access (CDMA) source.

* * * * *